US012505484B1

(12) United States Patent
Khuntia et al.

(10) Patent No.: US 12,505,484 B1
(45) Date of Patent: Dec. 23, 2025

(54) MONEYNESS INDEX ENGINE

(71) Applicant: Cboe Exchange, Inc., Chicago, IL (US)

(72) Inventors: Alok Khuntia, Downers Grove, IL (US); Florian Huchedé, Chicago, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/791,250

(22) Filed: Jul. 31, 2024

Related U.S. Application Data

(60) Provisional application No. 63/611,704, filed on Dec. 18, 2023, provisional application No. 63/533,991, filed on Aug. 22, 2023, provisional application No. 63/516,603, filed on Jul. 31, 2023.

(51) Int. Cl.
*G06Q 40/04* (2012.01)
(52) U.S. Cl.
CPC .................... *G06Q 40/04* (2013.01)
(58) Field of Classification Search
CPC ...................................... G06Q 40/04
See application file for complete search history.

(56) References Cited

U.S. PATENT DOCUMENTS

| 11,282,139 | B1* | 3/2022 | Winklevoss | G06Q 40/04 |
| 11,995,719 | B1* | 5/2024 | Isaacson | G06F 9/466 |
| 2010/0005032 | A1* | 1/2010 | Whaley | G06Q 40/04 |
| | | | | 705/37 |
| 2011/0082813 | A1* | 4/2011 | Shalen | G06Q 40/06 |
| | | | | 705/36 R |

FOREIGN PATENT DOCUMENTS

WO    WO-2016210426 A1 * 12/2016 ............. G06Q 40/04

OTHER PUBLICATIONS

Chan et a.: Informed trading under different market conditions and moneyness: Evidence from TXO options, 2009, Pacific-Basin Finance Journal 17, pp. 189-208 (Year: 2009).*
Chen et al.: The Effect of Option Trading Behavior on Option Prices, 2023, Journal of Risk and Financial Management, pp. 1-24 (Year: 2023).*
Martin et al.: Option moneywise Guide: ITM vs ATM vs OTM, May 27, 2025, pp. 1-13 (Year: 2025).*

* cited by examiner

*Primary Examiner* — Bijendra K Shrestha
(74) *Attorney, Agent, or Firm* — Fish & Richardson P.C.

(57) ABSTRACT

An exchange computer system and methods for using a moneyness index to provide a simplified and user-friendly way for users to trade daily positive or negative returns of an asset. A trade contract is built around a standardized index that tracks the return of an asset over a given period of time.

15 Claims, 14 Drawing Sheets

MONEYNESS INDEX ENGINE

CROSS-REFERENCE TO RELATED APPLICATIONS

This application claims the benefit of U.S. Provisional Patent Application Nos. 63/516,603, filed Jul. 31, 2023; and 63/533,991, filed Aug. 22, 2023; and 63/611,704, filed Dec. 18, 2023; all which are incorporated herein by reference in their entireties.

BACKGROUND

High volumes of financial instruments such as derivatives, stocks, and bonds are continuously traded at electronic exchanges in real time. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority.

SUMMARY

In an electronic or hybrid exchange environment, many trading options are available to traders. Some of the trading options require complex analytics to understand and extensive order instructions to trade. This document describes a system for listing, analyzing, and transacting of an exchange listed option contract that solves the problems. A moneyness index enables a simple and intuitive trading interface for the customer that does not require listing multiple strikes and associated contract level metrics. The determination of the moneyness index and the listing of associated options consumes less resources of the exchange, Options Clearing Corporation (OCC), or the brokerage industry. The moneyness index allows for trading of limited loss (and profit) option spread orders without the need for multiple option leg strike selections. The user interfaces for placing orders for the moneyness index can utilize Application Program Interfaces (APIs) to populate values and charts in customer facing trading GUIs.

For example, a moneyness index of a stock (or asset or other financial instrument) can describe a current price for the stock versus the prior market close price of the same stock, also referred to as a reference price. By organizing this information into the moneyness index, a computer system interface can provide a simplified way to trade daily positive or negative returns associated with a stock/asset without the complex decision making of traditional options contracts. Said another way, the computer system can provide a simple tradable product focused on the Zero Day-to-Expiration (0DTE) timeframe. The moneyness index tracks the returns of an asset over a particular time frame-often a single trading day but other time frames are possible. The moneyness index can assist a market participant (e.g., a trader) to easily determine if an asset will gain or lose more than the price of the corresponding Up or Down contract. For example, in some implementations, at settlement of a moneyness index, for every percent right the trader is, they make $100 for the given contract. Profit and Loss (PNL) can be easily understood by the trader as well. For example, a user interface can show PNL as the difference in percent move of the trade price vs. the settlement price.

In one example, a moneyness index for an asset SPX can be labeled SPXMM.

The value of SPXMM can be calculated as (current SPX price/prior SPX closing price)*100. In this example, SPXMM effectively resets to 100 after every market close. Alternatively, SPXMM can use a spot price implied from option pricing instead of an actual index price. This arrangement can allow for calculation of the index when option prices are live and index price is not updated, as in current Global Trading Hour (GTH) periods for SPX. In some implementations, SPXMM could be defined to use an implied spot only when SPX is not published, or it could use the implied spot continuously.

A computer system that lists, trades, and displays information for a moneyness index provides a number of advantages. For example, the moneyness index can facilitate the understanding and trading of 1-day price movements in an underlying financial instrument such as SPX.

The moneyness index and associated options can provide a very simple and intuitive workflow for traders to easily implement an option on the price change of a financial asset for a given period such as a 1-day period. This can lower premiums compared with analogous at the money options in underlyers, for example because of the moneyness index's lower index values. The moneyness index can also provide a normalization effect when this applied to different underlyers at least in part because the difference in price for the options is correlated to the difference in volatility of the underlyers. And furthermore, moneyness indices can be listed for a wide variety of underliers, providing 100 strike contracts, providing wide-spread advantages to the trading system as a whole. The workflow can be incorporated into a novel, single screen portfolio risk visualization tool that presents profit/loss bars for multiple price movement steps for distinct trading periods for a portfolio of listed options.

In some cases, moneyness indices can be created for different time periods. For example, 1-week, 1-month, and/or 1-year moneyness indices can be listed to permit trading of price movement for different durations. The various moneyness indices can list relevant information such as having an expiration date at a given time, which can be displayed simultaneously with other information in a single GUI screen.

The moneyness indices can transform the traditional complications of strike selection into a simple assessment of expected price movement for a security or asset within a given time window. Additional strikes (e.g. 95, 98, 99, 101, 102, 105) can be listed on the indices to permit capped gain/loss trading or additional strategies around price move. The moneyness index can potentially offer wider spreads on a relative basis than analogous options due to optionally having small (e.g., penny) increments, which can be a benefit for market makers. For traders, the moneyness index can translate single and multi-leg options trades into simple, directional, uncapped or limited loss price movement trades for a given time window. The moneyness indices can utilize an exchange provided quoted spreadbook with quoted spread markets for trading of limited loss trades. The moneyness index can also allow for the listing of delayed starting option contracts that follow the Option Symbology Initiative (OSI) Symbology format where the strike price of the option is determined at listing, which can allow for a GUI to display the moneyness index in a format that is familiar to traders. Therefore, representation of the Index and associated options facilitates can be provided in extremely simple and streamlined interfaces from brokers and can engage an otherwise untapped majority of the market that is confused by the complexities of existing listings and platforms.

Systems with moneyness indices can also provide different types of advantages for different types of users simultaneously. For example, for retail investors that are often less capitalized and have less time for trading, the moneyness index can provide a simplified trade selection with intuitive prices and targeted trading without hedging requirements. This can advantageously make access to moneyness indices—and the technology to interact with them—an effective introduction to options trading for a retail investor that does not have experience with options. By providing user interfaces that provide relevant, easily understood, and dynamically-updated information on a single screen or user interface, users can more easily and efficiently execute trades due to the technical advantages of such a system.

For institutional investors, that are often more capitalized and have more time for trading and analytics, the moneyness index can simultaneously provide different advantages. For example, the moneyness index can provide traders with tools for tactical event trading and targeted macro hedging. The traders can also take advantage of delayed-starting optionality and premium collecting strategies. With institutional traders greater access to analytics and data sources, moneyness indices can provide trading interfaces to quickly submit orders to take advantage of arbitrage opportunities, which are often fleeting and specific and could otherwise involve much more complicated interactions with user interfaces.

For exchange operators and other participants that provide brokerage services, the hardware and software used to list and transact the moneyness index is also the same hardware and software that underly other trading operations. For example, clearing and risk adjustment of the moneyness index can be done with some of the same or similar hardware and software used for some portions of clearing and risk adjustment of other indices.

The moneyness index can be associated with user interfaces that provide a variety of specific advantages that overcome technical limitations often associated with user interfaces. For example, user interfaces with simplified workflow for trading one day moves in SPX or any product (cash or physical) can be very easy to use for non-options savvy traders. These interfaces can include dynamically updating content for the user, and because the simplicity of the moneyness index requires less information to be presented to a user, all of the relevant information can be displayed at once. With a display of all relevant information, and by dynamically updating the relevant information, the user interface can provide users with data in a format this is conducive to parsing and understanding. While this is an advantage for typical users, it is of particular advantage to certain special populations. For example, some users have different abilities to interact with computer devices, and eliminating screen navigation events from the user interface can put them on even footing with typically-abled users. Consider a user with a manual dexterity deficit such as a tremor. If that user requires 3 seconds more to navigate from one screen to another in a user interface, and the user interface requires 5 screen navigations to execute a trade (one to read a value, one to provisionally enter data, one to confirm entry, one to navigate back to see if the value has changed, etc.), the differently-abled user may be at a fifteen second disadvantage relative to another user. Instead, this technology and create a user interface that can be utilized by both types of users without implicating any physical limitation of the user with the tremor.

One or more technical features may be utilized to ensure the dynamically-updating user interface. For example, various text fields that dynamically update can often have more or less text at different points in time. When two nearby fields are configured to show large amounts of text at the same time, the layout and formatting of the GUI can be modified by the computing system without requiring or waiting for user input. With this automatic and dynamic adjustment of display elements, the GUI can be maintained in a fully legible state even when contents in the GUI change and would otherwise cause portions of the text to be occluded, hidden behind a scrolling interaction, or otherwise inaccessible without a user input—and this avoidance of the user input (even a seemingly trivial one to a typically abled user) may allow the differently abled user to use the interface on the same footing as other users.

In an aspect, a method includes transmitting, by an exchange computer system and to a computer network comprising one or more user devices configured to wirelessly communicate with the exchange computer system, reference data for a financial instrument that includes a price for the financial instrument at a beginning of a time window; receiving, by the exchange computer system and through the computer network, 100-strike calls for an index associated with the financial instrument, wherein the index is a moneyness index of a current price for the financial instrument versus reference data; receiving, by the exchange computer system and through the computer network, 100-strike puts for the index associated with the financial instrument; receiving, by the exchange computer system and through the computer networks, trade instructions for the index, each trade instructions being based on one of the group comprising the 100-strike call and the 100-strike put call; for each received trade instruction, generating a trade record for the index in a delay buffer, the trade record comprising a data field recording an identifier of the time window; determining, after an end of the time window, an ending price for the financial instrument that represents the financial instrument's price at the end of the time window; and, for each trade record in the delay buffer, settling, after the end of the time window, each 100-strike call for the index and each 100-strike put for the index using the reference data and the ending price.

In some implementations, the method further comprises switching to an implied-price mode when a trade request is received outside of predetermined trading hours.

In some implementations, in the implied-price mode, the exchange computer system, utilizes an implied price determined using a weekly options price.

In some implementations, in the implied-price mode, the exchange computer system, utilizes an implied price determined using a real-time price over a user-specified number of days of a month.

In some implementations, the method further comprising responsive to determining that a time at which the trading instructions are received is within the time window, operating in an explicit-price mode in which trade instructions are accepted based on the reference data; and responsive to determining that a time at which the trading instructions are received is outside the time window, operating in an implied-price mode in which trade instructions are accepted based on the implied index.

In related aspects, corresponding non-transitory computer-readable storage medium, systems, devices can implement one or more of the features noted in the implementations above.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
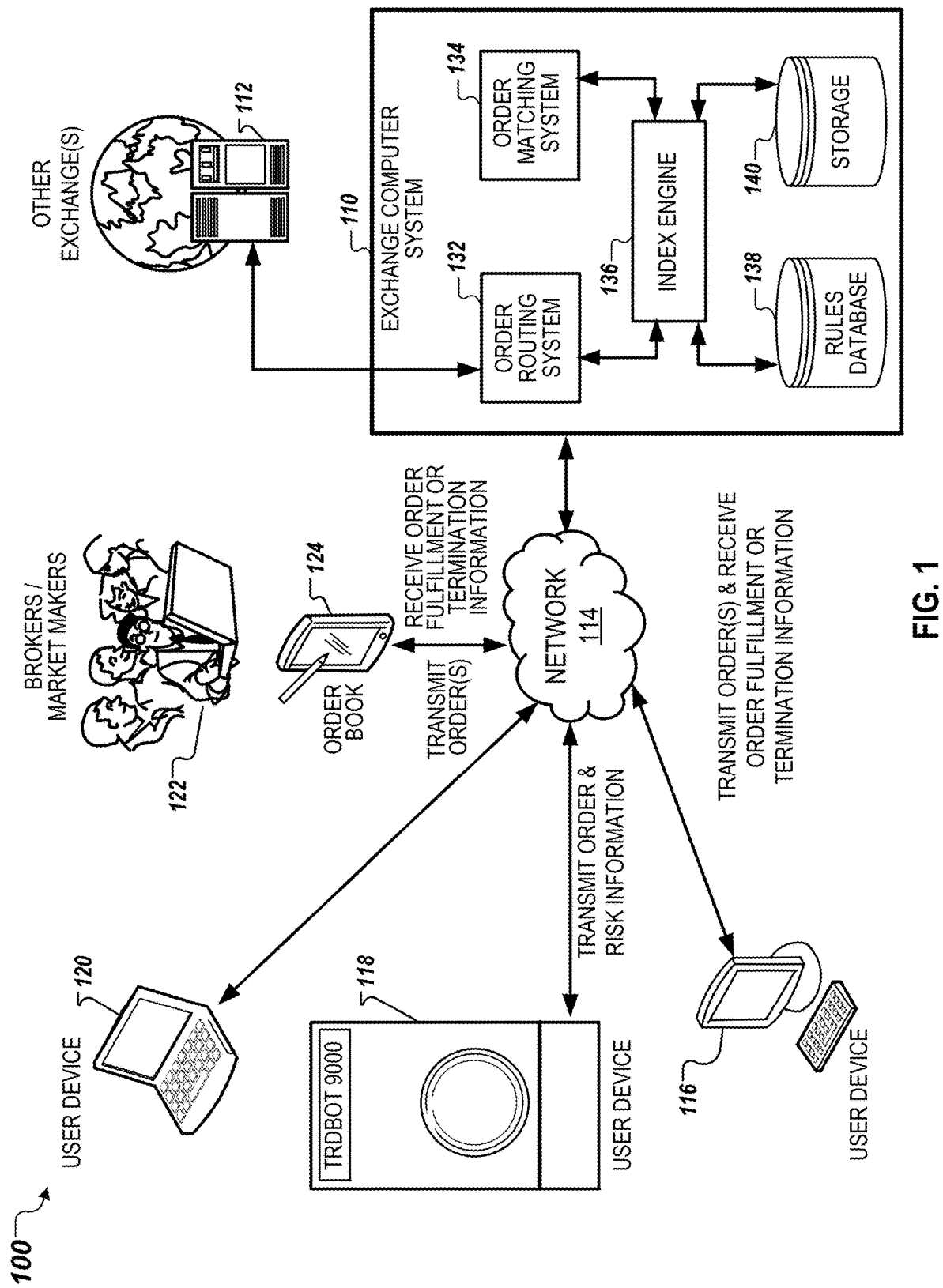
FIG. 1 is an example diagram of an exchange computer system and associated networks, devices, and users.

This disclosure describes technology that enables market participants to place contracts for a particular time period (e.g., 1-day) price movements of a financial asset. These moneyness indices can track the moneyness of a current prices of an asset versus the prior market close. This moneyness can describe the price of an asset relative to a reference price as a percent, so for example of an asset closes at $47.58 on day N, the next day a moneyness index for the asset may be created with reference data including a reference price of $47.58 and a reference date of N+1. Then, on day N+1 while trading is occurring and the current price of the asset shifts to, for example, $49.32, the moneyness of the asset is $49.32/$47.58, or approximately 103.657%. As will be appreciated, a value of 100% moneyness means that the asset is equal to 100% of the reference, a value of 96% moneyness means that the asset is equal to 96% of the reference, etc. For many applications, moneyness is a superior index to dollar change by allowing standardized comparisons across products and time. For example, an two assets on the same day may have reference values that differ greatly, but their moneyness indices can be directly compared because both moneyness indices use the same scale.

For a daily 1-day moneyness index, a 100-strike call and 100-strike put is listed that expires at the end of the next trading day and are quotable and tradable. The 100-strike call price reflects the expected "Up Move" for the index, while the 100-strike put price reflets the expected "Down Move." These options for Up Move and Down Move can be shown in retail trading platforms for each expiration date, for each moneyness index, for each duration or tenor (e.g., daily, weekly, monthly), and for any other variation in types of moneyness indices that are listed. And each of those moneyness indices can be accessed and traded in the platform without requiring the user to understand or navigate options chains or models to trade one-day (or other tenor) price moves.

For 1-day moneyness indices, the days to expiration of the option may be less than 2 based on this listing pattern, and other values are appropriate for the other tenors. But in addition to making the current day's moneyness index available, the same trading interface can provide functionality to trade additional expiries could be listed for any trading date in the future. For example, a trader may be interested, on a Monday, to purchase a moneyness index for both Monday and Thursday of that week, and the same interface may allow the trader to place orders for the Monday and Thursday moneyness index in the same GUI.

Theoretical pricing of these options can be configured to follow known pricing models for delayed-starting options and approximates the one-day move or breakeven of atm options (e.g., in percent terms). The moneyness indices can be cash settled according to the underlying asset at expiration, and specific ticker or other mechanism may be used to identify the daily closing level of the moneyness index. As will be appreciated, the settlement price for a given moneyness index can use the settlement price of underlying asset as an input value.

One set of formula that can be used in determining parameters of a moneyness index for an asset are:

Formulas Used for Contract Time $_{-T}$ Price
    K=Moneyness Strike; if K=100, K is the ATM strike
    $T_0$=Prior Trading Day Moneyness Index K-Call/Put is listed
    $T_n=T_0+n$; if n=1 then Ti is the next trading day, EOD, K-Call/Put on moneyness index expiration
    $t \in T_0$, $T_n$=Purchase time between prior trading day and n-day expiration
    $\tau_n \in (t, T_n)$=Current time between contract purchase time and n-day expiration
    $C_t(K, T_n)$=moneyness index K-Strike Call Premium when entering the trade
    $P_t(K, T_n)$=moneyness index K-Strike Put Premium when entering the trade Formulas Used for Current Time Contract Value
    $S_{T0}$=Asset Index Prior EOD Close Price
    $S_{\tau n}$=Asset Current Price
    $\tilde{S}_{\tau n} = (100 \times S\tau n)/ST0$=Moneyness Index Price
    $C_{\tau n}$=max $\tilde{S}_{\tau n}-K, 0 = \tilde{S}_{\tau n}-K+$=Moneyness Index Call Payoff
    $P_{\tau n}$=max $K-\tilde{S}_{\tau n}, 0 = K-\tilde{S}_{\tau n}+$=Moneyness Index Put Payoff
    $V_C^{Long} = C_{\tau n} - C_t$=PNL Long Call
    $V_{CShort} = C_t - C_{\tau n}$=PNL Short Call
    $V_P^{Long} = P_{\tau n} - P_t$=PNL Long Put
    $V_P^{Short} = P_t - P_{\tau n}$=PNL Short Put FIG. 1 is a diagram of an exemplary trading environment 100 for generating a moneyness index that can include an exchange computer system and the associated networks, devices, and users. Generally, the term "user" can refer to any entity that interacts with the exchange computer system and/or associated networks and devices. Users can include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner, or in a hybrid manner that combines electronic trading with aspects of traditional open-outcry systems. The exchange computer system 110 can receive orders for trading financial instruments locally on the floor and from remote electronic devices. The financial instruments can include securities such as stocks, options, futures contracts, or other derivatives associated with an underlying asset.

Network 114 connects the various components within the trading environment, and can be configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or sub-networks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User devices 116, 118, and 120 can include portable or stationary electronic devices, such as smartphones, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

User devices 116, 118, and 120 can transmit user input such as order information or risk information to the exchange computer system 110, and can also receive data from the exchange computer system 110 indicating that an order has been filled or canceled.

Users such as brokers/market makers 122 can also place orders and receive information about order fulfillment or termination through electronic order book 124, which can include a record of outstanding public customer limit orders that can be matched against future incoming orders.

The exchange computer system 110 includes an order routing system (ORS) 132, an order matching system (OMS) 134, an index engine 136 (also referred to as a "moneyness index engine," a "1-day movement index engine," a "move index engine," or a "movement index engine"), a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and can include processing systems that enable the management of high data volumes. The ORS 132 can, for example, receive order or quote information for the purchase or sale of financial instruments from one or more user devices 116, 118, 120, and 124. In some implementations, the ORS 132 can also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to the order matching system 134.

The order matching system (OMS) 134 can include processing systems that analyze and manipulate orders according to matching rules stored in the database 138. The OMS 134 can also include an electronic book (EBOOK) of orders and quotes with which incoming orders to buy or sell are matched, according to the matching rules. The EBOOK can also be implemented in a separate database such as storage 140, which can include multiple mass storage memory devices for the storage of order and quote information. When the OMS 134 determines that a match exists for an order (for example, when a bid matches an offer for sale), the order matching system 134 can mark the matched order or quote with a broker-specific identifier so that the broker sending the order or quote information can be identified.

The index engine 136 can be implemented using a combination of software and hardware. The index engine 136 can, for example, be implemented as one or more hardware processors configured to execute one or more algorithms, as described in further detail below. An example configuration of an exchange computer system featuring an index engine 136 is further described in FIG. 2A.

The index engine 136 can generate and disseminate a moneyness index for a financial instrument, including by generating reference data for a financial instrument (e.g., a date for a moneyness index of the instrument and a reference price for the financial instrument at the beginning of a particular time duration/window) to provide a contract-based index for the instrument. After generating the index corresponding to a stock market index, the index engine 136 can disseminate the index to other exchanges (e.g., exchanges 112) and one or more user devices (e.g., user devices 116, 118, 120) by the network 114.

As noted above, the generation and dissemination of moneyness index values significantly reduces the bandwidth and computing resources required by both the exchange computer system 110 and networked computer systems (e.g., user devices 116, 118, and 120) in each of several ways.

As a component of exchange computer system 110, index engine 136 is well suited to the role of a centralized and authoritative arbiter of index values, at least insofar as it is able to efficiently generate the values based on data to which exchange computer system 110 already has access. In contrast, and absent the service provided by index engine 136, other systems (e.g., user devices 116, 118, and 120) would need to redundantly devote significant bandwidth to monitoring this data.

Additionally, the practical application of moneyness index values and related financial instruments enables fulfillment of various complex strategies by virtue of a simple yet comprehensive and informative graphical user interface and significantly less network traffic than would otherwise be necessary. Complex order strategies (e.g., volatility spread, straddle/strangle, calendar spread, ratio spreads) rely on numerous orders to simultaneously buy and sell options at different strike prices, expiration dates, quantities, etc. Market participants submit large volumes of orders simultaneously to offset changes in prices that would otherwise result in losses for the market participant (e.g., hedging). In some cases, market participants submit large volumes of orders simultaneously to attempt to capture market expectations of the expected price movement for an asset, but cannot be realized until after the price movement occurs-resulting in a subset of the submitted orders being executed on an order book of the exchange computer system, while the remaining orders are canceled or expired.

In either case, the large volumes of orders result in extraneous amounts of traffic and computational resources used by the exchange computer system. The moneyness index allows for orders to achieve the desired outcome of complex trading strategies without having to receive or send large volumes of information that would otherwise cause the exchange computer system to consume resources, e.g., to maintain and disseminate data related to the open orders on an order book. In at least these ways, the generation and dissemination of moneyness index values, and the processing of orders involving financial instruments related to the moneyness index, dramatically improves the computational efficiency with which complex strategies can be implemented and fulfilled.

The exchange computer system 110 can also facilitate an order for a financial instrument corresponding to the moneyness index value. For example, the exchange computer system 110 can be configured to receive data from one or more user devices (e.g., user devices 116, 118, and 120) by the network 114 connected to the exchange computer system 110. The received data describes a request to enter the order for the moneyness index value in the electronic order book 124. The exchange computer system 110 facilitates the transaction by determining a second order in the electronic order book 124 matches the order described in the received data. The exchange computer system 110 can utilize the ORS 132 to route the order from the received data and the OMS 134 to match the second order in the electronic order book 124 to the order.

The exchange computer system 110 can also be configured to simultaneously receive (e.g., by the network 114 and ORS 132 of the exchange computer system 110) from one or more user devices, one or more orders using the moneyness index.

In some implementations, the exchange computer system 110 is a distributed computer system that includes an order entry port (e.g., by network 114), an order routing system (e.g., ORS 132), an order matching system (e.g., OMS 134), and an index engine (e.g., index engine 136). The distributed computer system can operate multiple hardware and software processes in parallel configurations. The order entry port receives the order from the data sent to the exchange computer system by a user device and the order routing system is configure to route the order to a destination associated with the order. As an example, the destination can include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and can store one or more of telemetric data, user profiles, user history, and rules and algorithms for matching quotes, bids, and orders.

Upon completion of a trade (through the floor in open outcry as entered into the PAR system, or through automatic execution through the OMS 134 and index engine 136), the fill information is passed through the OMS 134 and the ORS 132 to one or more user devices 116, 118, 120, and 124, and to the index engine 136. The index engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA).

Figure 2A:
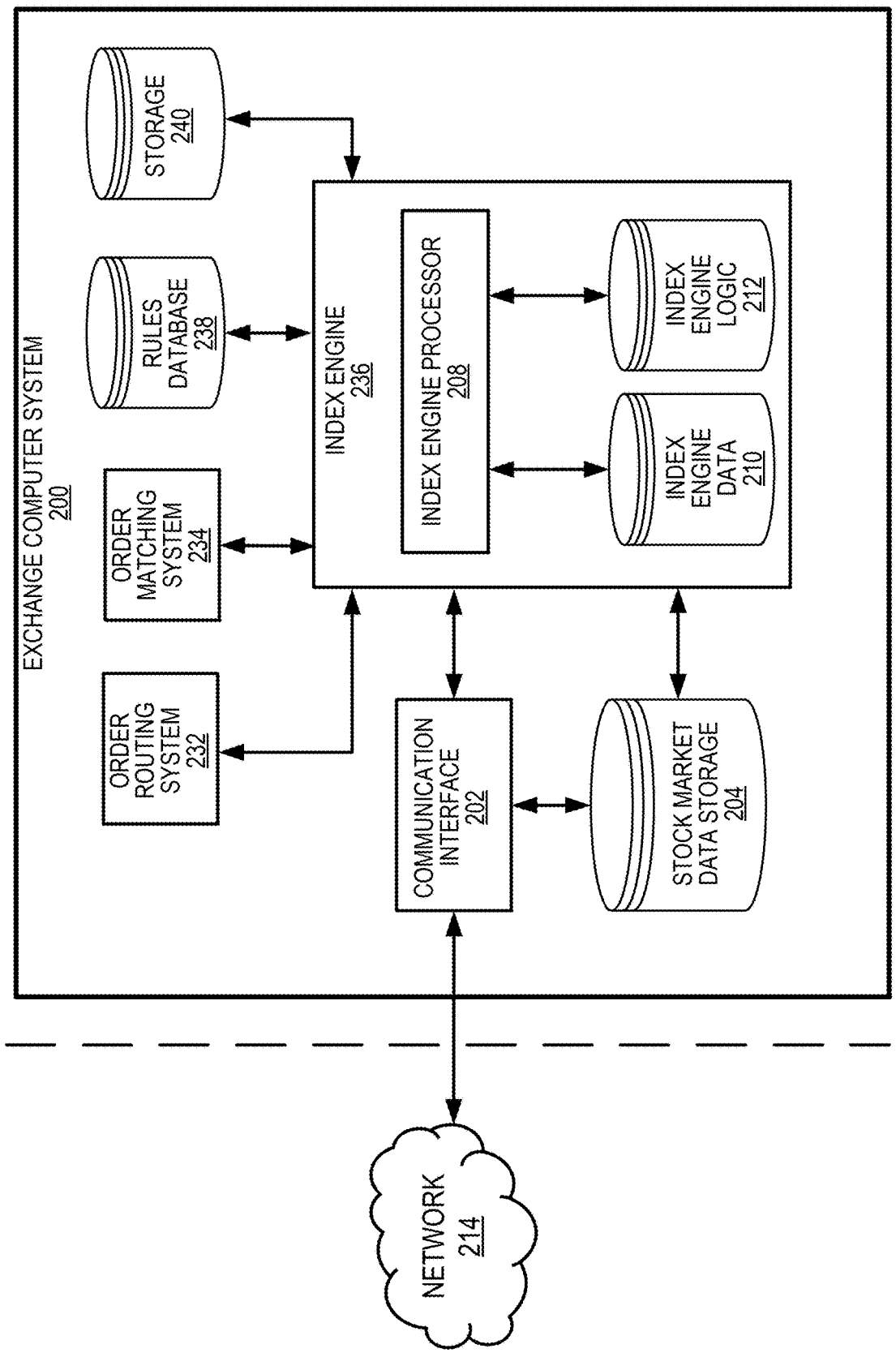
FIGS. 2A-2B are an example diagram of an exchange computer system including an index engine.

FIG. 2A is a diagram of an example exchange computer system 200 including an index engine 236 configured to generate a moneyness index and associated reference data for the moneyness index values. The exchange computer system 200 can be implemented by software, hardware, or some combination as described herein. As an example, the exchange computer system 200 can be implemented as a server, a computer, or other device or processing component using proprietary software designed and implemented to achieve the functionality described herein. The exchange computer system 200 can be distributed or subdivided between a plurality of entities e.g., multiple computing devices.

The exchange computer system 200 can include a communication interface 202, coupled with a stock market data storage 204. The communication interface 202 can be communicatively linked to an index engine 236, which includes an index engine processor 208, index engine data 210, and index engine logic 212. The index engine 236 can also be communicatively linked to an ordering matching system 234, an order routing system 232, a rules database 238, and storage 240 of the exchange computer system 200. The communication links in the exchange computer system 200 can be established by a system bus, network, or one or more other connection mechanisms. As an example, the connection mechanisms can include a wired connection, a wireless connection, or a combination thereof. For example, the connection can be a physical connection, such as a wired Ethernet connection. In another example, the connection can be a wireless connection, such as a cellular telephone network, an 802.11, 802.16, 802.20 controls or components, a WiMax network, or any other type of network. Further, network 214 can be a public network, such as the Internet, a private network, such as an intranet, or combinations thereof, and can utilize a variety of networking protocols now available or later developed including, but not limited to TCP/IP based networking protocols.

The index engine processor 208 can include one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. The index engine processor 208 can carry out one or more instructions using one or more arithmetic, logical, and/or input/output operations. Though index engine processor 208 is illustrated as a single component, index engine processor 208 can be integrated in whole or in part with other components of the exchange computer system 200.

Data storage e.g., stock market data storage 204 and index engine data 210, may be a main memory, a static memory, or a dynamic memory. Stock market data storage 204 and storage for index engine data 210 can include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, the stock market data storage 204 and storage for index engine data 210 can include a cache or random access memory for the index engine processor 208. Stock market data storage 204 and storage for index engine data 210 can be separate from the index engine processor 208, such as a cache memory of a processor, the system memory, or other memory. Stock market data storage 204 and storage for index engine data 210 can be an external storage device or database for storing data. Examples can include a hard drive, compact disc ("CD"), digital video disc ("DVD"), memory card, memory stick, universal serial bus ("USB") memory device, or any other device operative to store data.

As further shown, the index engine 236 can include index engine data 210 and/or index engine logic 212. The index engine data 210 can include one or more types of data suitable for a given implementation. For example, index engine data 210 can include data (such as input datasets) that can be stored in memory. Index engine logic 212 can include, for example, machine language instructions executable by index engine 236 to carry out various functions, such as the functionality of the methods and systems described herein. In some implementations, the functions, acts or tasks can be independent of the particular type of instructions sets, storage media, processor or processing strategy and can be performed by software, hardware, integrated circuits, firmware, micro-code and the like, operating alone or in combination. Processing strategies can include multiprocessing, multitasking, parallel processing and the like.

The index engine 236 is an example of the index engine 136 described in reference to FIG. 1 above, e.g., a moneyness index engine 136. The index engine 236 can be configured to generate a moneyness index representing a change in price of an underlying asset for a given time window (e.g., a 1-day window) that includes data storing human-readable opinions and other dynamic-interface data to be displayed in an order interface for the moneyness index. For example, generating the moneyness index can include determining various order parameters, and generating text-based descriptions of orders having those parameters.

In the exchange computer system 200, the communication interface 202 can include one or more structures, and associated equipment, for receiving data from one or more sources and distributing data to a group of one or more destinations. In some implementations, the communication interface 202 can include one or more additional communication interfaces and can operate in different configurations (e.g., distributed system, parallel). The communication interface 202 can be configured to receive input datasets from one or more entities (e.g., user devices or other exchanges) and store all or part of the input datasets in stock market data storage 204. The communication interface 202 can also be configured to communicate all or part of the input datasets to the index engine 236 once the input datasets are stored or otherwise processed. The communication interface 202 can include a transceiver having one or more input/output ports connected to the network 214 to securely transmit implied movement data from the index engine 236 to user computing devices.

As an example, the input datasets are stored in stock market data storage 204 can be partitioned (e.g., horizontal, vertical, functional) into designated memory locations (e.g., virtual addresses) based on qualities of the input datasets, e.g., a type of stock market index, a type of stock market index option, a type of stock option, and a type of stock. In some implementations, the input datasets with data related to component stock options can be stored in stock market data storage 204 and include a linking identifier (e.g., address, memory mapping) to identify a corresponding stock for each of the component stock options. In some implementations, the stock market data storage 204 can be configured to receive an indicator describing the operating status (e.g., receiving, clearing, storing) input datasets of the communication interface 202.

The input datasets from the communication interface 202 can include financial market data (e.g., market intelligence) corresponding to a stock market index (e.g., Standard and Poor's 500 Index) and the component stocks corresponding to the stock market index. For example, financial market data can include volatilities, interest rates, returns (e.g., historical, expected), market capitalization, sector, prices, liquidity, and other metrics related to the component stocks and stock market index. Financial market data can also include measures, estimates, and other related data for options (e.g., calls, puts), futures, and other derivatives for the stock market index and component stocks. The input datasets can also include corresponding log files to describe and store the financial market data e.g., a log file describing volatility for each component stock option. The log files can include metadata to tag or characterize data, e.g., corresponding time periods for which the data was recorded. For example, the log files can include a tag to be used for sorting or filtering the data of the log files.

Upon receiving input datasets from the communication interface 202, including data stored in the stock market data storage 204, the index engine 236 can perform further processes including receiving requests and accessing metadata. The index engine 236 can perform operations using the index engine processor 208, with instructions stored in the index engine logic 212, and data stored in index engine data 210. The data stored in index engine data 210 can include all of or a subset (e.g., filtered) of the data stored in stock market data storage 204, where the subset of the data stored in the index engine data 210 is filtered based on a specified time period. The index engine 236 can perform operations on the index engine data 210 including deleting, archiving, tagging, and resetting. The index engine 236 can utilize metadata, including log files, to process (e.g., filtering, sorting) the index engine data 210.

The index engine 236 can also access other components of the exchange computer system 200 including the order matching system 234, order routing system 232, rules database 238, and storage 240. The order matching system 234 can be configured to match an order received from the user device (e.g. user devices 116, 118, and 120) to another order based on the matching rules stored in the rules database 238. The order routing system 232 can be configured to route the order received from the user device to a destination associated with the order. The storage 240 can include additional data from the exchange computer system 200, accessed by the index engine 236 for processing.

An exchange computer system 110 of FIG. 1 or exchange computer system 200 of FIG. 2 that includes the index engine 236 can be configured to generate a moneyness index and associated reference data for a stock market index in a particular time window. For example, the index engine 236 can be configured (e.g., by index engine logic 212) to obtain data through the communication interface 202 such as data related to stocks for an underlying asset, data to the stock market index, and data related to stock options of the underlying asset within the time window. The index engine logic 212 configures the index engine 236 to process the data and perform the steps to generate a moneyness index and the corresponding reference data. By coupling the index engine 236 to exchange computer system components, such as order routing system 232, order matching system 234, rules database 238, etc., the index engine 236 allows the exchange computer system to be configured to generate a moneyness index that can be traded (e.g., executed through orders) to user devices (e.g., user devices 116, 118, and 120) described in reference to FIG. 1 above.

The index engine 236 and related components (e.g., index engine processor 208, index engine data 210, index engine logic 212) include software and hardware that are configured to generate the moneyness index and reference data. In contrast to exchange computer systems without the index engine 236, the index engine 236 provides the exchange computer system 200 with a higher throughput to process signals (and associated data from the signals) between the exchange and data sources, e.g., stock market data from other exchange, order information from user devices. Furthermore, the index engine 236 is configured to process subsets of signals that are relevant to the generation of moneyness index values, among from large volumes of signals (e.g.,) data, received by the exchange computer system 200.

In some implementations, the communication interface 202 can be expanded to include additional ports that are configured to provide dataflow to and from the index engine 236 of the exchange computer system 200. The expansion of data flow ports that are uniquely configured the memory for the index engine processor 208 can be expanded to process additional data. In some implementations, the index engine logic 212 can be further programmed to correlate data received, e.g., by the communication interface 202, and thus allow the exchange computer system to pre-allocate resources to determine a moneyness index and reference data.

In some implementation, the exchange computer system 200 can be configured to generate a notification (e.g., an alert) based on moneyness index values. The index engine 236 can generate moneyness index values, and the exchange computer system 200 can be configured to determine if a moneyness index value meets particular criteria or a condition. Examples of conditions can include the moneyness index value exceeding a threshold value, falling below a threshold value, or maintaining a value in a range of values for a duration of time. Upon detection of the criteria based on the moneyness index value, the exchange computer system 200 can generate an alert and provide the alert to computing devices that are connected to the exchange computer system 200, such as user devices 116, 118, and 120. The alert can be provided to other connected exchanges, e.g., exchanges 112.

The alert can indicate to receiving devices that the moneyness index for a stock market index indicates an exchange computer system is likely to execute and facilitate orders based on price movement of underlying assets, their options, and the stock market index made up of component stocks for the assets. In some cases, the alert can indicate one or more of a low price movement, a high price movement, a target threshold value of price movement, and a range of price movements. Providing the alert to computing devices can inform market participants that market conditions are resulting in turbulent price movements, e.g., upsides and downsides, and can result in fewer orders being submitted to an order book of the exchange computer system. Thus, the alert allows for improved timing when receiving, submitting, and executing orders, in response to expected market conditions and corresponding impact to prices of underlying assets and their corresponding options.

As noted above, the exchange computer system 110 can securely transmit a series of moneyness index values generated based on data received over successive periods of time to connected user computing devices (e.g., user devices 116, 118, 120). The values can be displayed, for example, within a graphical user interface of an application that facilitates continuous real-time trading, through the exchange computer system, of financial instruments related to the moneyness index.

Figure 2B:
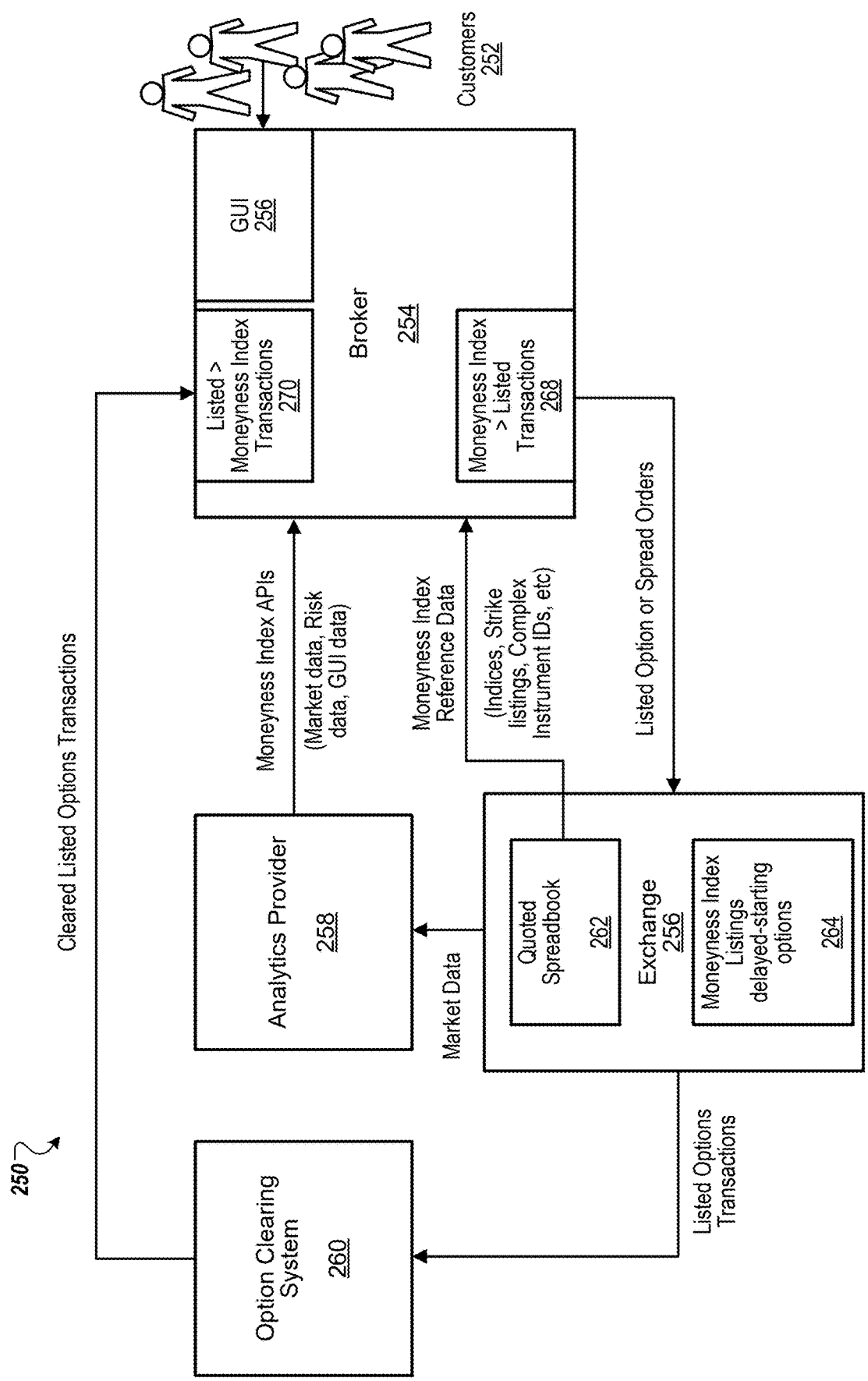

FIG. 2B is an example diagram of a system that uses the moneyness index. In the system 250, certain users (e.g., customers) 252 can use computing devices, such as mobile phones or computers, to communicated with a broker 254 through a GUI interface 256. The broker 254 can receive information from an exchange 256 and analytics provider 258. An option clearing system 260 can communicate with the exchange 256 and the broker 254.

The exchange 256 stores and updates a quoted spread-book 262 that stores working orders for clients of the exchange 256 which include, but is not limited to, the broker 254. The exchange 256 also stores and updates moneyness index listings 264, which can include delayed-starting options as well as other information about options. The broker 254 can store and update orders including moneyness index orders for listed transactions 266 and listed moneyness index transaction 270.

The exchange 256 can transmit, to the broker 254, reference data related to one or more moneyness indices. The reference data can include various types of information, including indices, strike listings, complex instrument IDs, data about an underlying asset of a moneyness index. The reference data can include a price for a financial instrument at a beginning of a time window, an identifier of the time window (e.g., a calendar date) and other appropriate information depending on the particular features of the moneyness index (e.g., a starting date and ending date for a multi-day moneyness index). This reference data can be used in determining features of the moneyness index, including but not limited to a comparison of a current price for the financial instrument versus reference data.

The broker 254 can transmit listed option or spread orders to the exchange 256. For example, when a customer 252 uses a GUI to submit an order to the Broker 254 through the GUI interface 256, the broker 254 can generate an order request and bundle the order request with other order requests, and send the bundle of order requests to the exchange 256. The exchange 256 can identify transactions to execute to fill the orders, for example creating new option contracts and matching buyers and sellers of the moneyness index. These listed option transactions can be transmitted to the option clearing system 260, which can clear the listed option transactions and report to the broker 254.

For each created contract for the moneyness index, the exchange 256 can generate a trade record to record information needed to settle the moneyness index. For example, the trade record can include data fields for a unique identifier for an order or contract, an identifier of the time window (e.g., a calendar date), parameters of the contract (e.g., a 100-strike call, a 100-strike put, a call or put of a different value). In some implementations, the exchange 256 can store the trade record in a delay buffer. Then, after the time window expires (e.g., after the close of business on the day associated with a 1-day moneyness index contract), the exchange 256 can transmit data for a transaction to be cleared by option clearing system 260 as part of the contract settlement.

The analytics provider 258 can provide data to the broker 254 through one or more APIs. For example, a reference data API can be used to provide request/response API information or files, such as the reference data for various moneyness indices. The reference data API can provide information about contract specifications to the broker, for example for use in populating in dynamically updating GUIs accessible to the customers 252 through the GUI interface 256. Unique identifiers (e.g., ComplexInstrumentIDs) can also be provided through the reference data API.

The analytics provider 258 can provide a moneyness index API to the broker 254, for example as a streaming API to provide dynamic data as the dynamic data changes. This moneyness index API can provide exhaustive risk analytics for all available moneyness index contracts, or an appropriate subset thereof. This can be used to provide the customers 252 with a GUI that show their holding quantity multiplied by the per-contract API values to get the customer's 252 position or portfolio totals. In some implementations, all fields required to populate analytics GUIs shown here will be available via this and other APIs, with dynamic data provided on a streaming basis to make the dynamic data correctly reflect the underlying state of the market.

The analytics provider 258 can provide a market data API to the broker 254, for example as a streaming API to provide dynamic data as the dynamic data changes. This market data API can provide real time prices for all available moneyness indices and related indices, or an appropriate subset thereof. In some implementations, all fields required to populate analytics GUIs shown here will be available via this and other APIs, with dynamic data provided on a streaming basis to make the dynamic data correctly reflect the underlying state of the market.

Although shown separately from the exchange 256, in some implementations, the analytics provider 258 may be part of the exchange system 256.

FIGS. 3A-3F are illustrations of exemplary graphical user interfaces for display of indices and trading of an index. These graphical user interfaces can be provided to various users, e.g., brokers, market participants, savvy and non-savvy traders, to convey information in an easily-digestible format for viewers. For example, the interfaces can be implemented without option chains or complex analytics, without dense grids or confusing tables, and with easy navigation and trade selection elements.

The interfaces can display dynamic-interface data indicative of an index associated with a financial instrument such as a moneyness index. These dynamic-interface data can include dynamically updating values for dynamic display. For example, as market conditions change, market data can be provided from the analytics provider 258 to the broker 254 through one or more streaming APIs, and updated dynamically without user input on the display on a user's devices.

As shown in various interfaces, the graphical representations can be configured to concurrently show various user interface elements for providing output to the user and receiving input from the user. In some implementations, these interface elements include, but are not limited to: i) a first interface element to buy the index in an up condition; ii) a second interface element to sell the index in the up condition; iii) a third interface element to buy the index in a down condition; iv) a fourth interface element to sell the index in the down condition; and v) dynamically updating information about expected outcomes of orders associated with each of the first interface element, the second interface element, the third interface element, and the fourth interface element.

At least some of the dynamic-interface data shown on the interfaces can be updated while in the time window based on changes to the financial instrument in the time window. That is to say, for a given moneyness index for a particular day, data for the moneyness index shown on the interfaces can be continuously updated throughout the day without waiting for or requiring user input to refresh the display. This data can include, but is not limited to, an ending price for the financial instrument that represents the financial instrument's price at the end of the time window. While in many cases, this ending price may not change, it will be appreciated that in some extreme cases this ending price will change dynamically (e.g., in response to uncovered fraud, to correct a technological error causing an incorrect display).

The interfaces can be used to manage the interactions between a computer system and user through graphical elements such as windows on a display. Windows display various types of outputs for various computer processes and may contain controls to accept user input for those processes. The user interface is configurable based on the type of device and display on which the user interface is being displayed. For example, to accommodate a particular display size, the vertical and horizontal margins of the a user-interface window (e.g., 304) may be adjusted and a word wrap function may be utilized to wrap the text based upon the new margins, and, where necessary, reducing the text size to permit the entirety of the textual information to be viewable in the unobscured portion. The textual information is scaled based upon a scaling factor that is calculated using a mathematical algorithm. First, an area of the window is calculated. Next, a scaling factor is calculated which is proportional to the difference in area between the window and a reference window size. The font size of the textual information is changed in accordance with the scaling factor. The resized window and text can then be displayed. By adjusting the user interface based on the device and display type, the user interfaces can be implemented in types of electronic devices with displays.

Figure 3A:
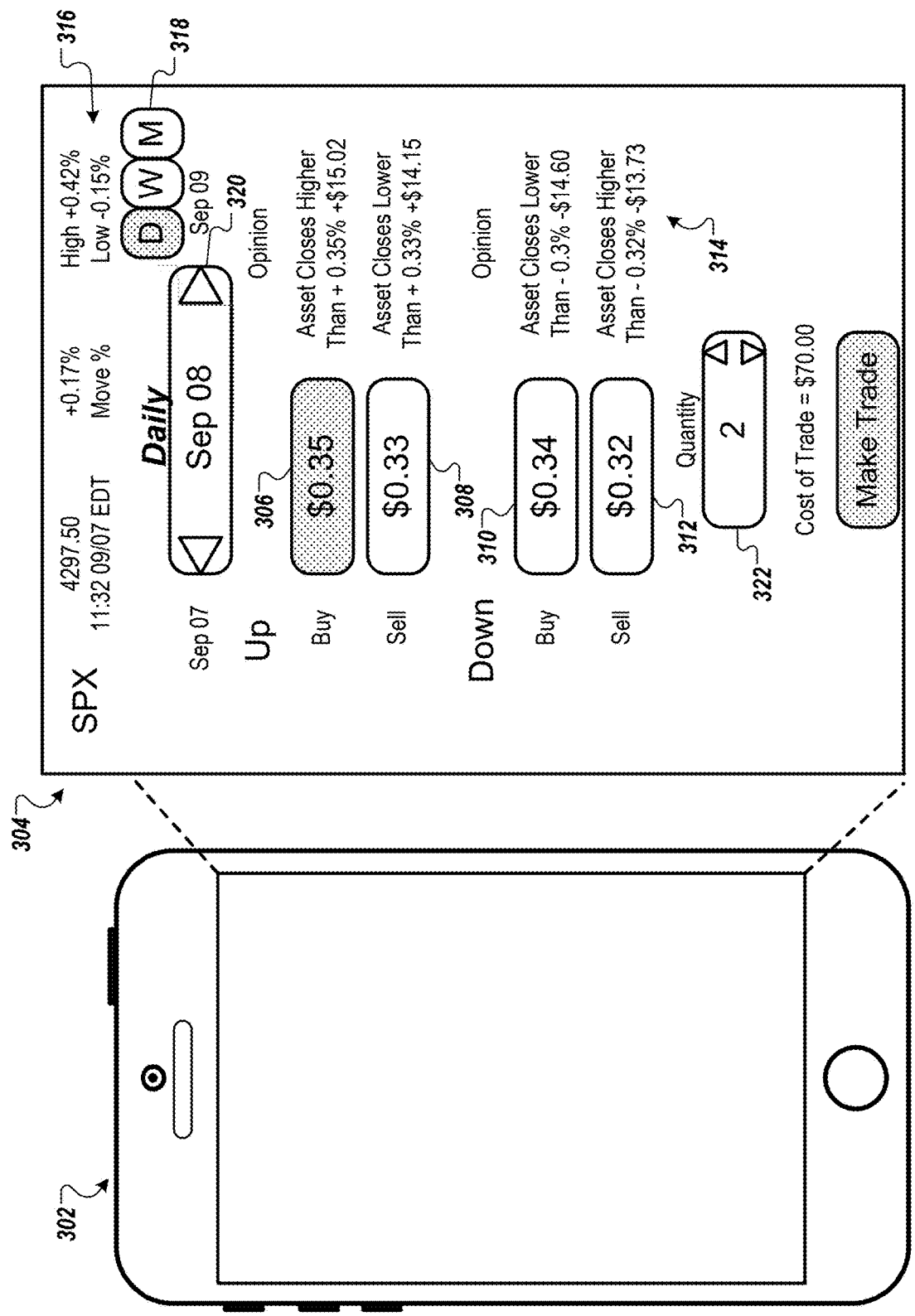
FIGS. 3A-3F are illustrations of exemplary graphical user interfaces for display of indices and trading of an index.

FIG. 3A shows an example device 302 displaying an interface 304 which can be used by a user (e.g., a customer 252) to place an order for 100-strike call and/or 100-strike put. As shown, the interface 304 provides for easy trade selection.

The interface 304 can include a first interface element 306 to buy a moneyness index in an up condition. The interface 304 can include a second interface element 308 to sell the moneyness index in the up condition. The interface 304 can include a third interface element 310 to buy the moneyness index in a down condition. The interface 304 can include a fourth interface element 312 to sell the moneyness index in the down condition. For example, the interface elements 306-312 can be presented as user-clickable buttons on a touchscreen of the device 302. In this interface, the UP interface elements represent the 100-strike call and DOWN elements represents 100-strike put.

The interface 304 can include dynamically updating information 314 about expected outcomes of orders associated with each of the first interface element, the second interface element, the third interface element, and the fourth interface element. For example, the dynamically updating information 314 can include first textual information, second textual information, third textual information, etc. displayed in a first window, a second window, third window, etc. The dynamically updating information 314 can be dynamically updated with information from the broker 254, and, in some cases, repositioned and reformatted to avoid overlapping textual information, etc. In various implementations, the prices can be displayed in raw form or multiplied by 100 to show total cost for a single contract. Each (or a subset thereof) trade is explained with "breakeven" values shown.

The dynamically updated information 314 can include asset price and prices changes 316 of the underlying asset associated with a moneyness index, displayed in a percent format. The interface 304 can include a tenor selector 318 representing the time window for which the price move is calculated (daily, weekly, monthly) for the moneyness index. The interface 304 can include an expiration date selector 320 to select the date of expiration for the moneyness index.

The interface 304 can include a quantity selection element 322 for the user to select a quantity. The quantity selection element 322 can include textual information showing the total cost of an order at that quantity.

Figure 3B:
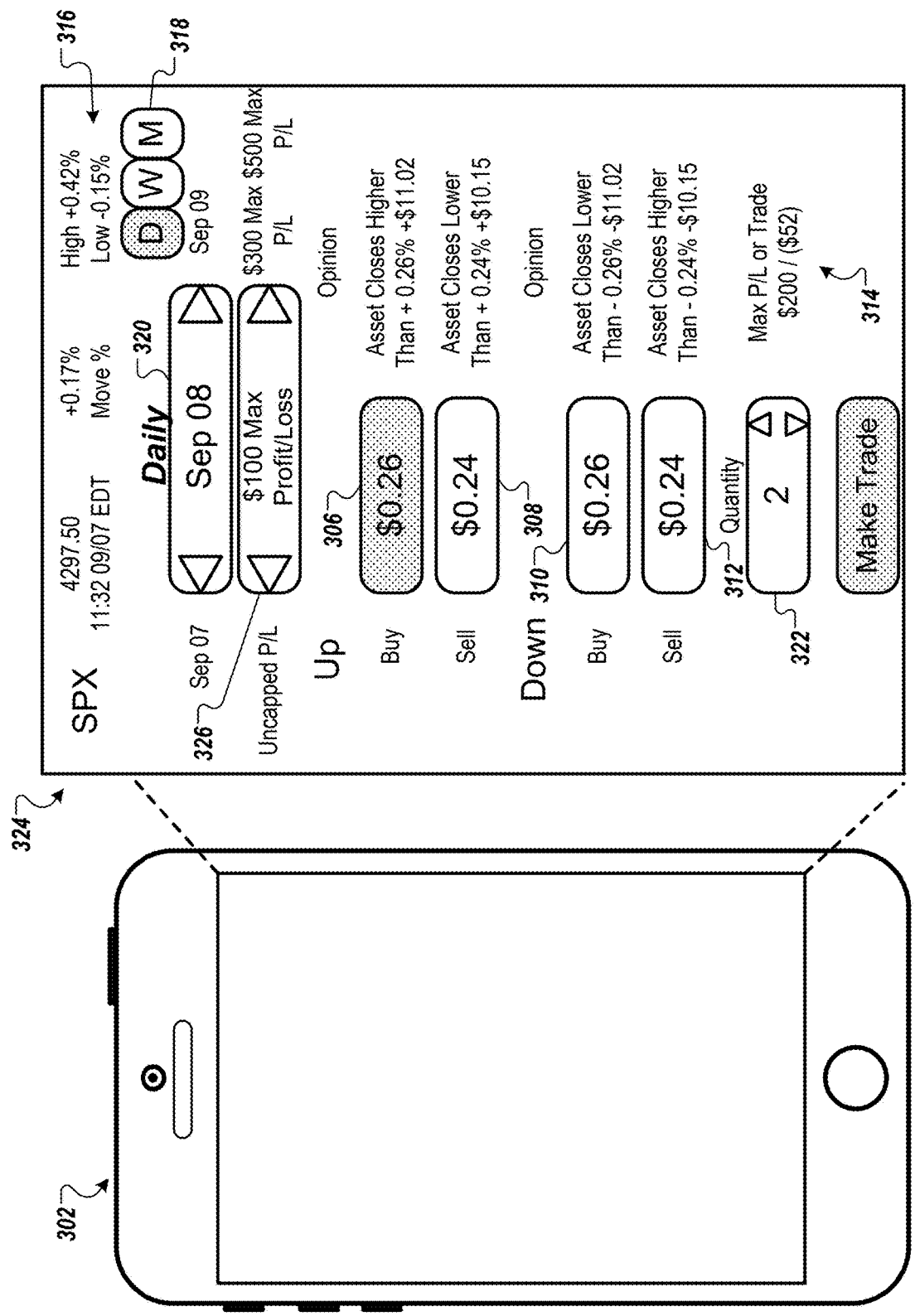

FIG. 3B shows the example device 302 displaying an interface 324 which can be used by the user to place an order in a limited profit/loss manner. In this example, the limited loss moneyness index trade is a spread trade with the listed 100-strike option and another listed leg that provides the maximum profit or loss limit. The price of the limited loss contract (spread) can be displayed in raw quoted form or multiplied by 100 to include the multiplier. The available limited loss increments can be determined by an exchange (e.g., the exchange 256) according to underlying asset volatility and market demand.

The interface 324 can include a limited loss selector 326. The limited loss selector along with the UP or DOWN trade selection via the interface elements 306-312 can be used by the device 302 to determine the actual listed contracts that define the moneyness index trade.

At least some of the dynamic-interface data 314 can include information about possible trades with limited loss/profit option spread to be displayed on a single screen of the interface 324 (and potentially other interfaces). The interface 324 can automatically update to reflect updates to the dynamic-interface data within the time window so that as the market changes, the changes are reflected in the interface. These changes can include information from an exchange-provided quoted spreadbook with quoted spread markets for the limited loss/profit option.

The following table shows examples of representative trades with corresponding listed contracts:

| Trade Type | GUI Label | Listed Leg 1 | Listed Leg 2 |
|---|---|---|---|
| Uncapped | Buy UP | +1 100 Call | none |
| Uncapped | Buy DOWN | +1 100 Put | none |
| Uncapped | Sell UP | −1 100 Call | none |
| Uncapped | Sell DOWN | −1 100 Put | none |
| Limited Loss | Buy UP w/max $100 P/L | +1 100 Call | −1 101 Call |
| Limited Loss | Sell UP w/max $300 P/L | +1 100 Put | +1 103 Call |
| Limited Loss | Buy DOWN w/max $100 P/L | −1 100 Call | −1 99 Put |
| Limited Loss | Sell DOWN w/max $300 P/L | −1 100 Put | +1 97 Put |

Figure 3C:
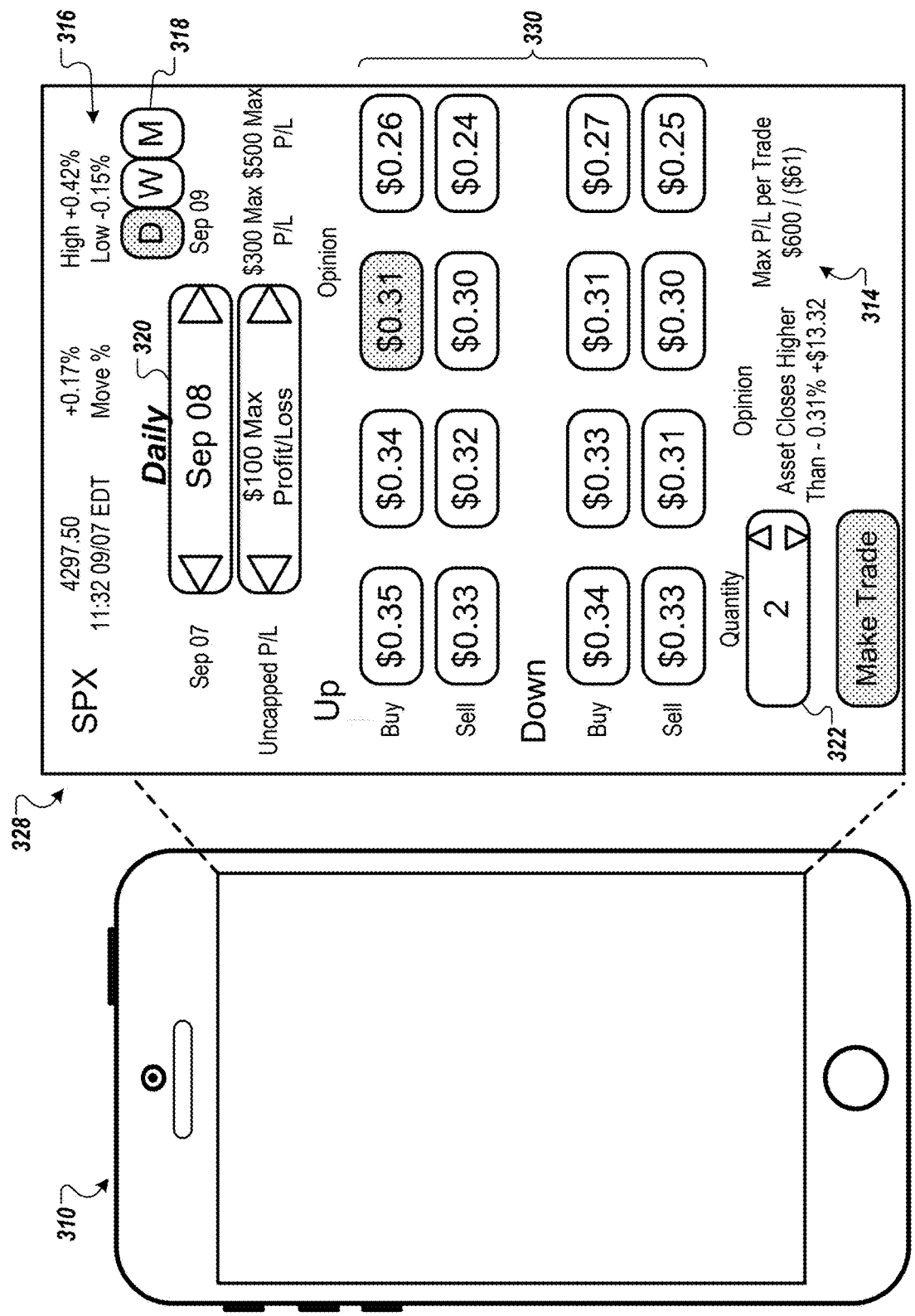

FIG. 3C shows an example device 302 displaying an interface 328 to allow for comparative trade selection if the user desires. The available limited loss increments can be determined by the exchange according to underlying asset volatility and market demand by listing only specific strikes and defining spreads (on the quoted spreadbook) that provide the determined increments. Interface elements 330 show data that allows the user to compare pricing of different uncapped or limited loss trades on a single screen and to select one of those options.

Figure 3D:
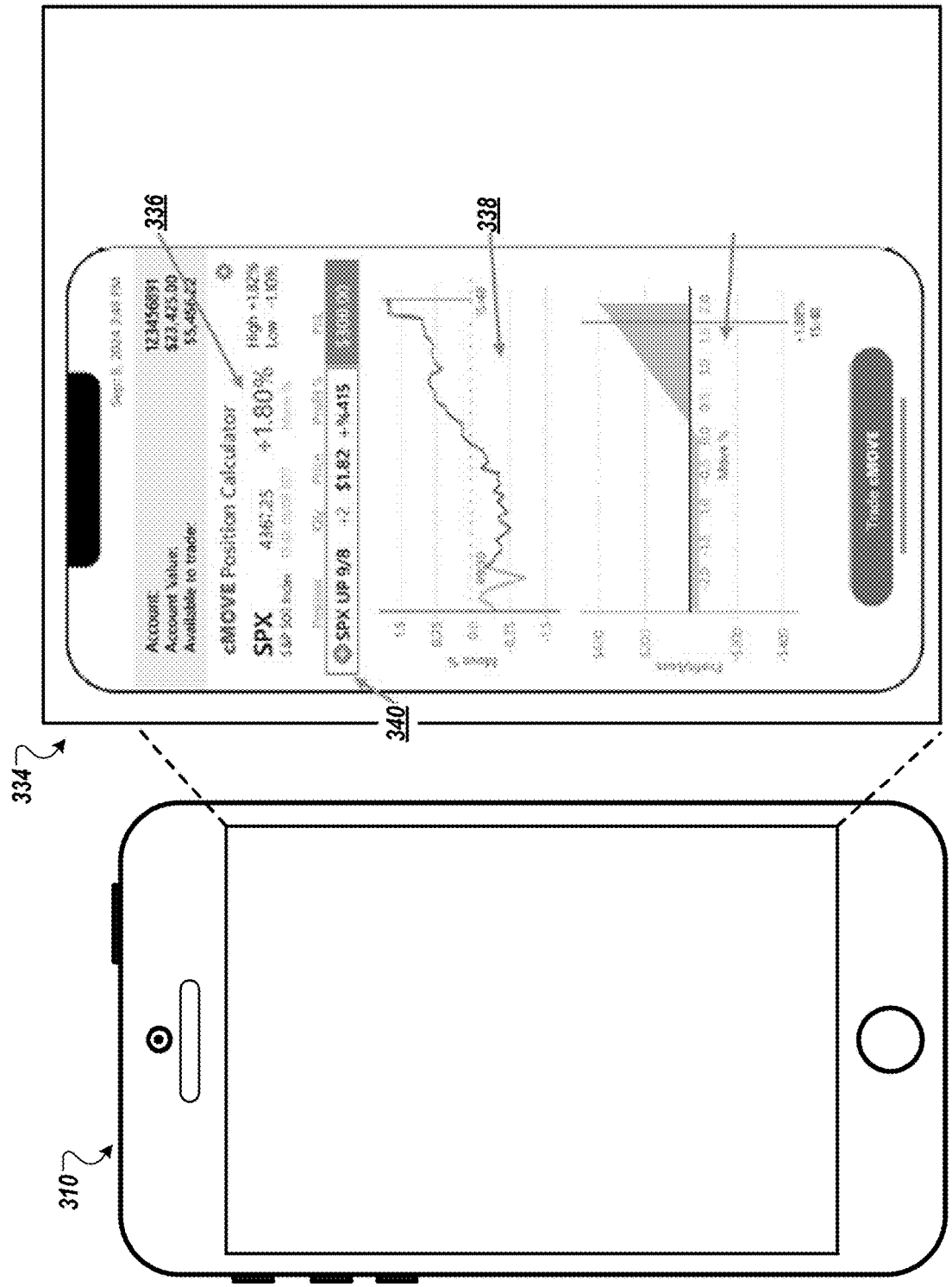

FIG. 3D shows an example device 302 displaying an interface 334 which provides a detailed screen for evaluating the performance of a single position on its expiration period. This expiration date position interface may be relevant for a moneyness index contract on the expiration period of that contract as price action of the underlyer does may not impact the profit and loss of a moneyness index contract prior to the moneyness index's expiration period.

A move % interface element 336 shows the price change, in percent, for the underlying asset or security which is obtained by subtracting 100 from the moneyness index that corresponds to the underlying asset or security and time duration of the given position. A move % chart interface element 338 shows a time series of the move % throughout a current expiration period. A breakeven chart interface element 340 showing a Profit and Loss profile vs Move % for the position. Current Move % is also highlighted.

Figure 3E:
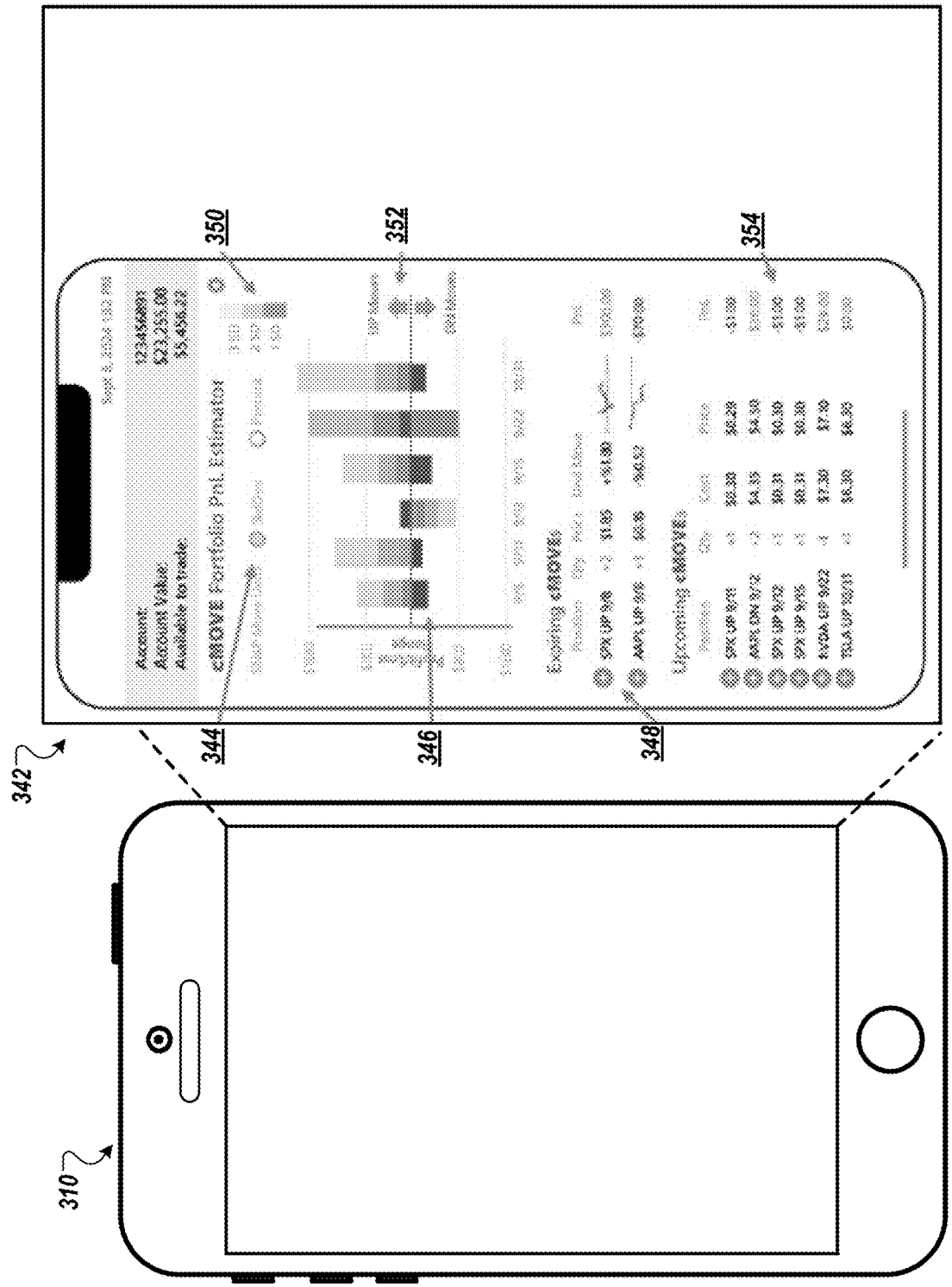

FIG. 3E shows an example device 302 displaying an interface 342 which provides a unique screen for evaluating the financial risk of a portfolio of moneyness index positions which provides multiple ranges of Profit and Loss (PNL) for distinct trading periods. Since moneyness index contracts are sensitive to price action of the underlying asset or security during their expiration period, traditional forward looking risk analysis tools for options portfolios may not be as not well-suited as the interface 342. This view is different from other views of options risk because, in this instance, there may be no continuity of financial risk in time leading up to the expiration period of the contract.

The interface 342 can include displaying a single screen showing a plurality of portfolio risk visualization tool the represents profit/loss bars for multiple price movement steps for distinct trading periods for a portfolio of listed options.

Interface element units selector 344 can display the size of steps for PnL estimations. Interface element PnL bars 346 can display an estimate of the profit/loss of all positions for various steps of market movement per day. Green and red can indicate profit and loss. Color intensity can corresponds to step size. Interface element expiring positions 348 can be segregated from upcoming positions as their PnL may be sensitive to market movement during the expiration period. Time series of PnL is shown per position. Interface element legend 350 can display PnL step sizes based on color intensity. Interface element market direction legend 352 can display PnL bars above the center are from Up moves and PnL bars below the center are from Down moves. Interface element upcoming positions 354 are segregated from expiring positions as their PnL is may not be sensitive to market movement prior to the expiration period.

Figure 3F:
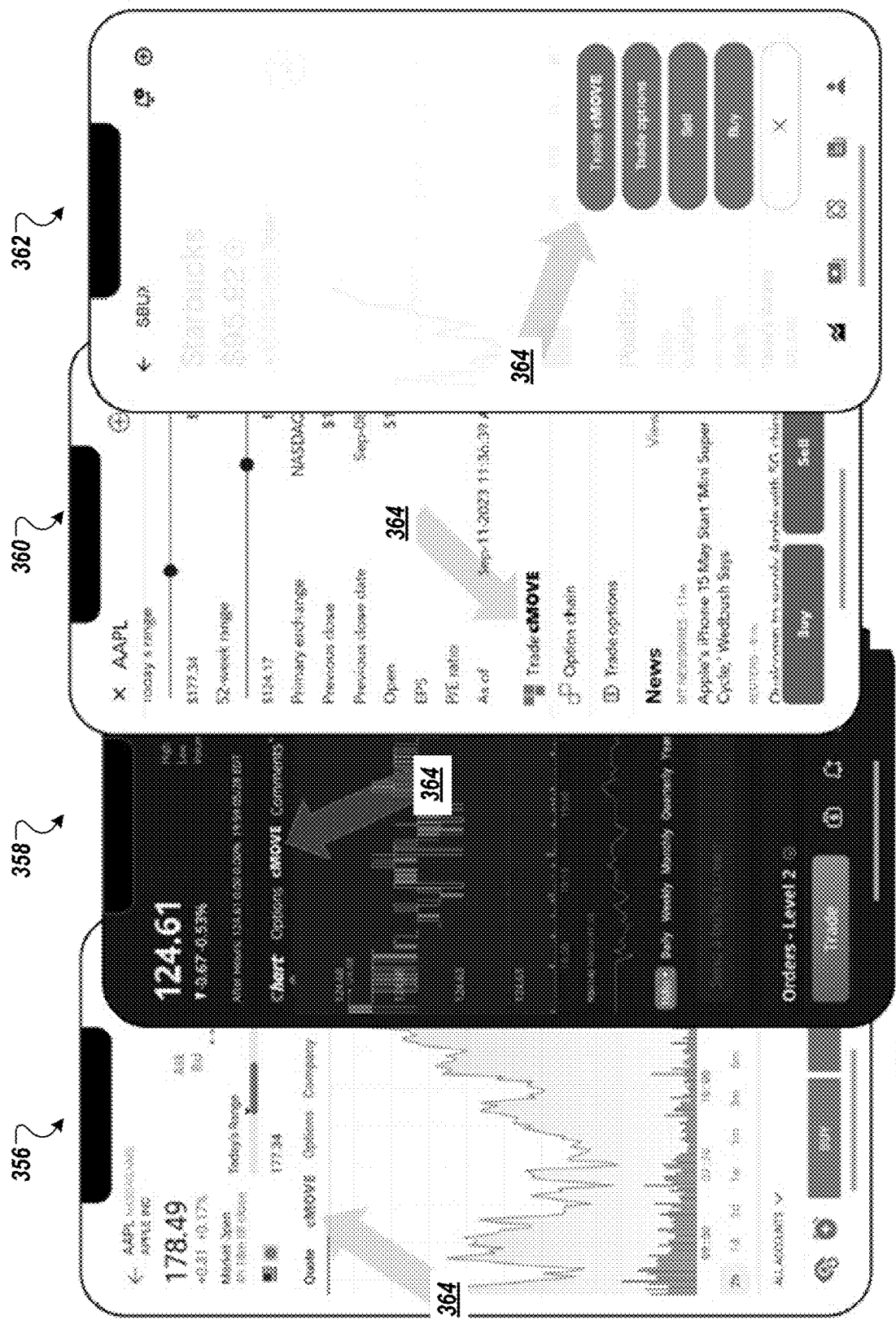

FIG. 3F shows an example of various interfaces 356-362 that each contain an interface element 364 to launch one of the interfaces 304, 324, 328, or another appropriate interface, from various trading applications. This allows the various trading applications to provide a simplified workflow for trading contracts that target price changes over specified time windows for an underlying asset. As this technology has a unique simplified trading workflow, it can be accessed through designated access points on retail trading platforms to not be confused with traditional options trading. In various implementations, moneyness index contract information can still be displayed in traditional option montages if desired by the provider.

Figure 4:
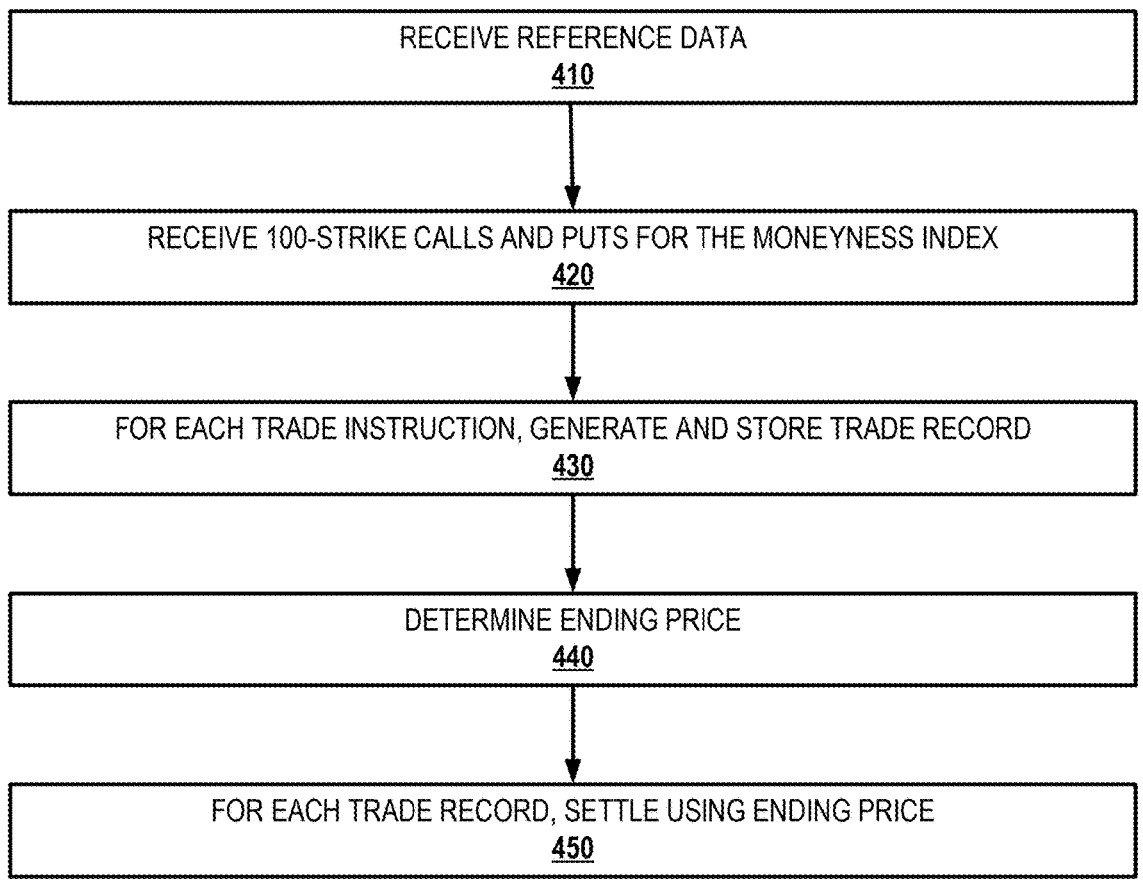
FIG. 4 is a flowchart of an example process for generating and disseminating an index and trading the index.

FIG. 4 is a flowchart of an example process 400 for generating and disseminating an index and trading the index. Briefly, the process 400 includes the steps of transmitting reference data 410, receiving 100-strike calls and puts for a moneyness index 420, generating trade records for each trade instruction 430, determining an ending price for the moneyness index 440, and settling using the ending prices for each trade record 450.

Reference data for a financial instrument is transmitted 410. For example, the exchange 256 can transmit, to the broker 254 or other users, moneyness index reference data that include indices, strike listings, complex instrument IDs, and other related data. In some cases, the reference data can be used to configure, at a device of a customer 252 or broker 254, dynamic interface data that is then displayed interfaces 304, 324, 328, or another appropriate interface. The dynamic-interface data can provide data indicative of an index associated with the financial instrument during a particular time period such as dynamically updated values for display in user interfaces 304, 324, 328.

In operation 420, 100-strike calls and puts for the moneyness index can be received, e.g., from the broker or one or more user devices. For example, the customers 252 can enter trade instructions including these puts and calls through interfaces 304, 324, 328, or another appropriate interface. The trade instructions can be entered through the GUI interface 256 and transmitted to the broker 254 and or the exchange 256.

For each received trade instruction, a trade record, as described above, is generated for the index and stored in a delay buffer 430.

After an end of the time window indicated in the trade instructions, an ending price for the financial instrument is determined 440. For example, the exchange 256 can determine and record a value that represents the price of the financial instrument related to the moneyness index at the end of the time window.

For each trade record in the delay buffer, after the end of the time window, each 100-strike call for the index and each 100-strike put for the index is settled using the reference data and the ending price 450. For example, the exchange 256 can transmit listed option transactions, including those defined in the trade records in its delay buffer, to the option clearing system 260.

After clearing the order, the options clearing system 260 may transmit second data indicative of the cleared transaction to the broker or customer devices through the computer network. For example, the option clearing system 260 can transmit cleared listed options transaction to the broker 254, and the broker can transmit the second data to the appropriate devices of the customers 252 through the GUI interface 256 for display on interfaces 304, 324, 328, or another appropriate interface.

In some cases, trade instructions can be received, by the exchange computer system from the one or more devices and through the computer network, outside of a trading day. For example, a customer 252 may submit a trade request outside of business hours when the underlying asset of the moneyness index is not being actively traded. In such cases, elements of the system 250 such as the broker 254, the exchange 256, the analytics provider 258, and/or the option clearing system 260 can switch from an explicit-price mode, in which trade instructions are accepted based on the reference data, to an implied-price mode. The implied-price mode utilizes an implied price that is determined by the exchange 256 using a reference price, such as a weekly options price or real-time price over a particular period of time, e.g., over a user-specified number of days of a month.

Figure 5A:
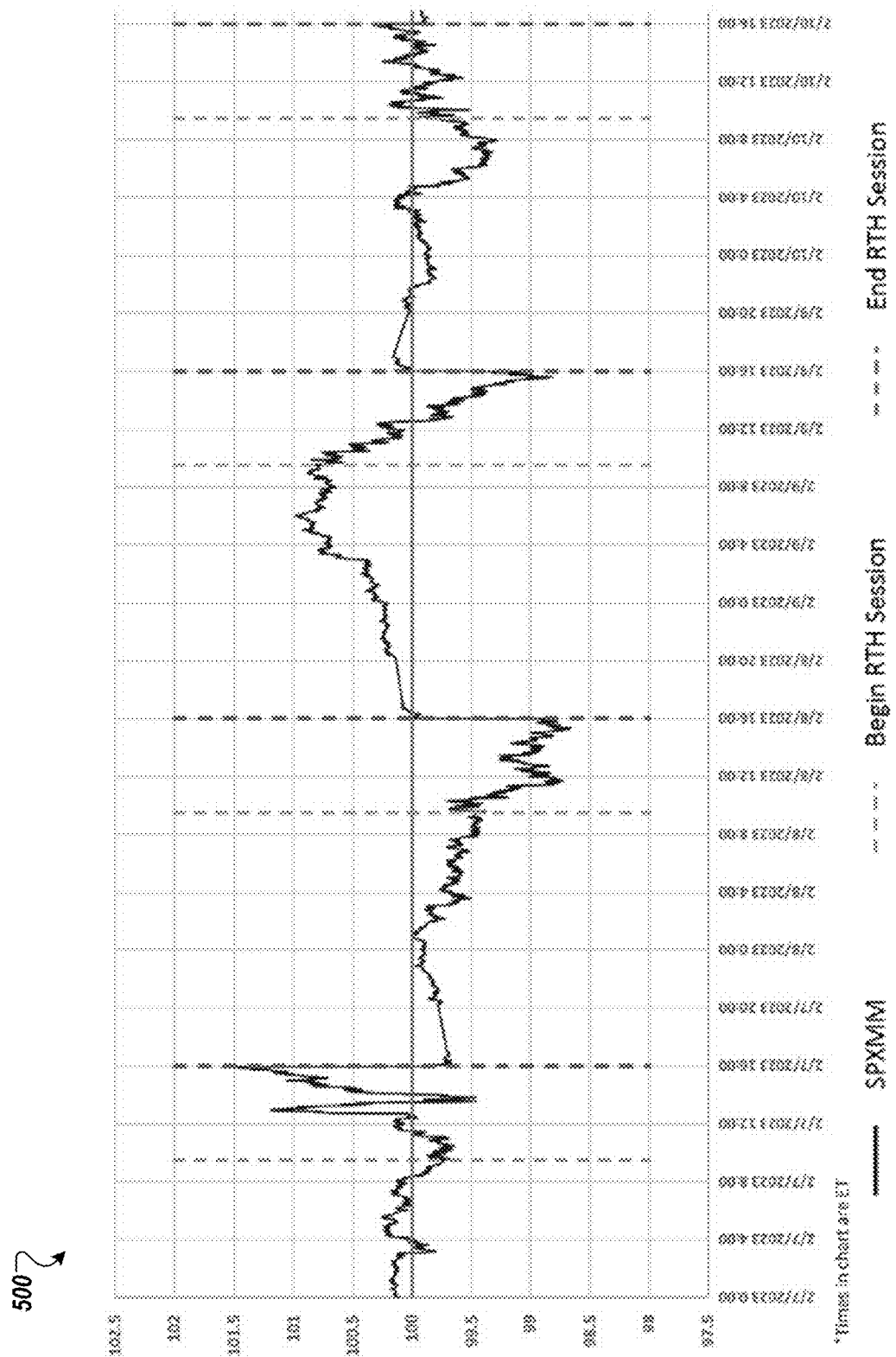
FIGS. 5A-5C are example charts of data related to moneyness move indices.
Figure 5B:
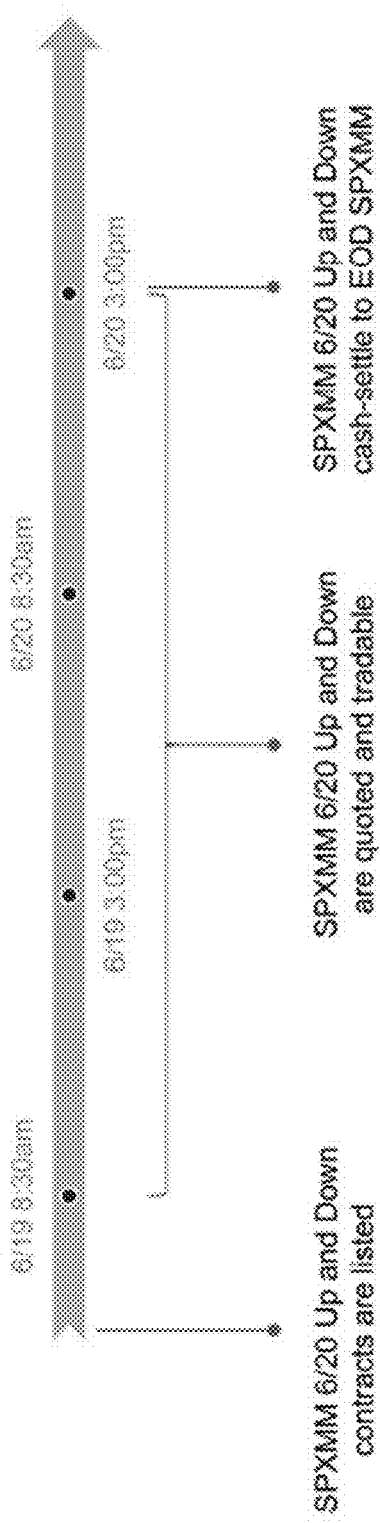
Figure 5C:
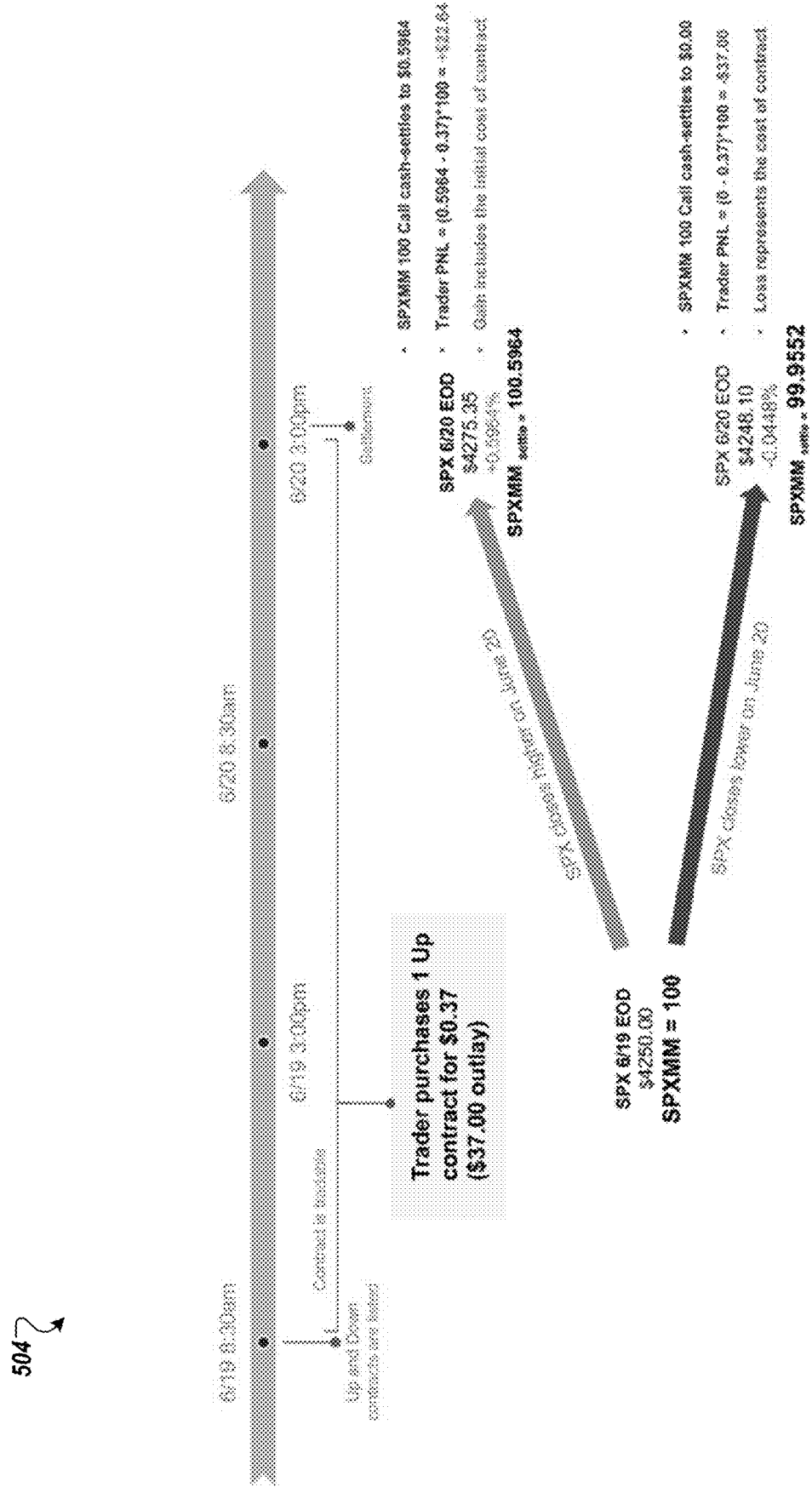

FIGS. 5A-5C are example charts 500-504 of data related to moneyness move indices. For example, the charts 500-504 can be visual representations of data that may or may not be displayed on one or more computing devices.

Chart 500 shows timing information related to a moneyness index called "SPXMM" The horizontal axis shows time and the vertical axis shows the value of the moneyness index. As described previously, when the current prices of the underlying asset—in this instance SPX—is the same as the reference price, the moneyness index has a value of 100. By observing the trend of SPXMM over time, the user viewing the chart 500 can observe the value of SPXMM across various trading days.

Chart 502 shows a schematic timeline of events for SPXMM for a single 1-day time window. Before 8:30 AM (beginning Regular Trading Hours (RTH) on 06/19, SPXMM UP and Down contracts are listed for a later date, 06/20. From open of business on 06/19 through close of business on 06/20, those UP and DOWN contracts for 06/20 are quotable and tradable. Then, sometime after the close of business on 06/20 (e.g., immediately after close of business (e.g., ending RTH hours), after a fixed delay after close of business, after a variable delay after close of business), the UP and DOWN contracts are cash-settled based on the end-of-day (EOD) value of SPXMM.

Chart 504 shows a purchase of the SPXX moneyness index contract, and two possible outcomes of the contract. As shown, a trader purchases 1 UP contract for $0.37, incurring a $37.00 outlay. Depending on the performance of the SPX asset, the SPXMM contract can settle, resulting in a profit or loss depending on the details of the contract and the value of SPXMM at close of business on 06/20.

Figure 6:
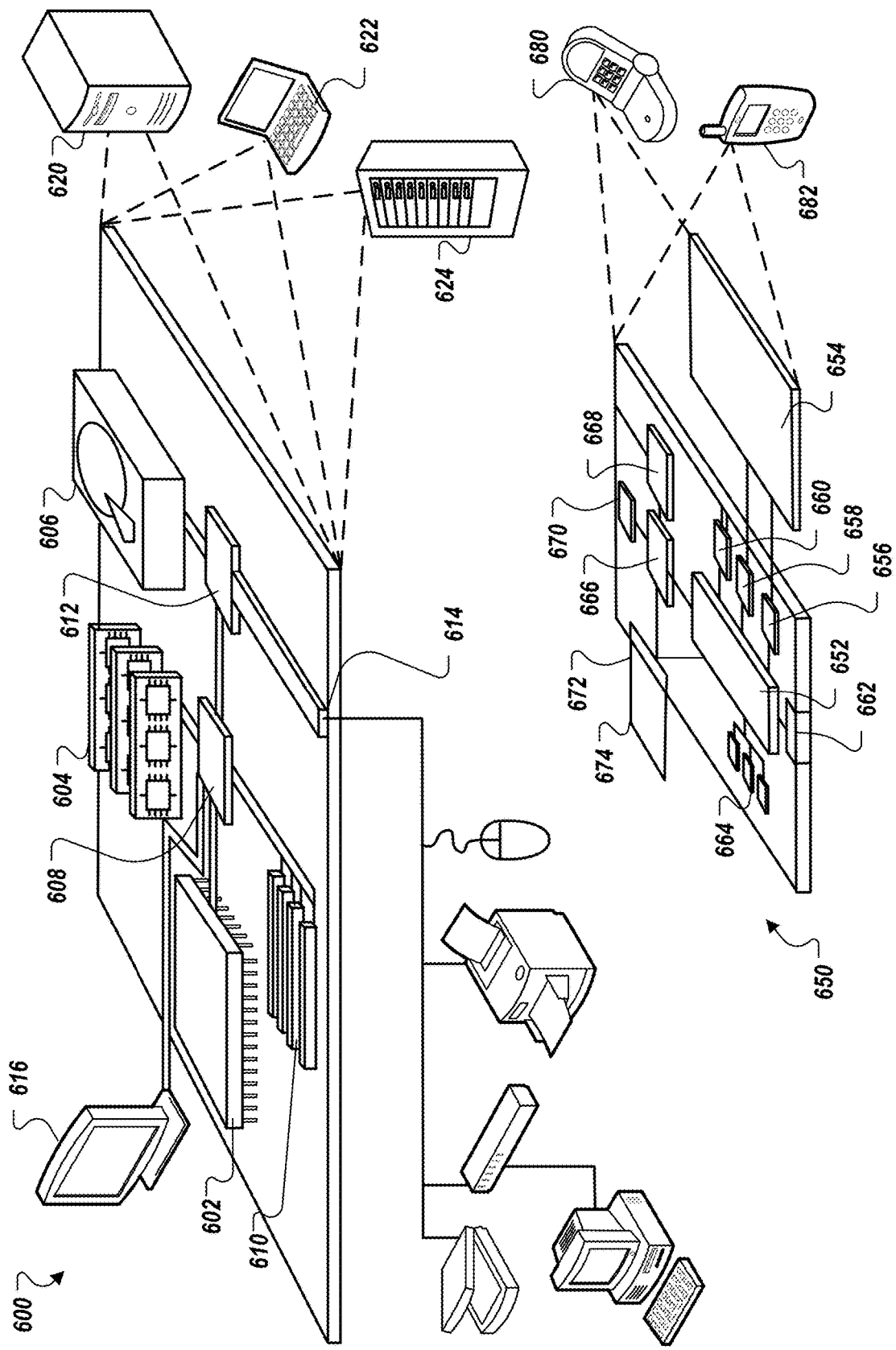
FIG. 6 is an computing device for an exchange computer system.

FIG. 6 is a schematic diagram illustrating an example of a computing system used in an exchange computer system. The computing system includes computing device 600 and a mobile computing device 650 that can be used to implement the techniques described herein. For example, one or more components of the exchange computer system 110 be an example of the computing device 600 or the mobile computing device 650.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various buses, and can be mounted on a common motherboard or in other manners as appropriate. The processor 602 can process instructions for execution within the computing device 600, including instructions stored in the memory 604 or on the storage device 606 to display graphical information for a Graphical User Interface (GUI) on an external input/output device, such as a display 616 coupled to the high-speed interface 608. In other implementations, multiple processors and/or multiple buses can be used, as appropriate, along with multiple memories and types of memory. In addition, multiple computing devices can be connected, with each device providing portions of the operations (e.g., as a server bank, a group of blade servers, or a multi-processor system). In some implementations, the processor 602 is a single threaded processor. In some implementations, the processor 602 is a multi-threaded processor. In some implementations, the processor 602 is a quantum computer.

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may include one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory). In some implementations, instructions are stored in an information carrier such that the instructions, when executed by one or more processing devices (e.g., processor 652), perform one or more methods, such as those described above. The instructions can also be stored by one or more storage devices, such as one or more computer or machine-readable mediums (for example, the memory 664, the expansion memory 674, or memory on the processor 652).

In some implementations, the instructions can be received in a propagated signal, for example, over the transceiver 668 or the external interface 662.

The mobile computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 3G/4G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, among others) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Implementations have been described, but other implementations are within the scope of the following claims.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, in some implementations of FIG. 4, step 440 may be performed before or at the same time as step 450. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method comprising:
transmitting, by an exchange computer system and to a computer network comprising one or more user devices configured to wirelessly communicate with the exchange computer system, reference data for a financial instrument that includes a price for the financial instrument at a beginning of a time window;
providing, to at least one of the one or more user devices through the computer network, a graphical user interface configured to generate and display dynamic-interface data indicative of a moneyness index associated with the financial instrument;
receiving, by the exchange computer system and through the computer network, strike calls of a first type for an index associated with the financial instrument, wherein the index is the moneyness index of a current price for the financial instrument versus reference data;
receiving, by the exchange computer system and through the computer network, strike puts of a first type for the index associated with the financial instrument;
receiving, by the exchange computer system and through the computer networks, trade instructions for the index, each trade instruction being based on one of a group comprising the strike calls of the first type and the strike puts of the first type;
for each received trade instruction, generating a trade record for the index and storing the trade record in a delay buffer, the trade record comprising a data field recording an identifier of the time window;
determining, after an end of the time window, an ending price for the financial instrument that represents a price of the financial instrument at the end of the time window; and
for each trade record in the delay buffer, settling, after the end of the time window, each strike call of the first type for the index and each strike put of the first type for the index using the reference data and the ending price; and
providing, to the at least one of the one or more user devices through the computer network, data for configuring the graphical user interface to dynamically update content in the graphical user interface including the moneyness index.

2. The method of claim 1, the method further comprising switching to an implied-price mode when a trade request is received outside of predetermined trading hours.

3. The method of claim 2, wherein, in the implied-price mode, the exchange computer system, utilizes an implied price determined using a weekly options price.

4. The method of claim 2, wherein, in the implied-price mode, the exchange computer system, utilizes an implied price determined using a real-time price over a user-specified number of days of a month.

5. The method of claim 1, the method further comprising:
responsive to determining that a time at which the trading instructions are received is within the time window, operating in an explicit-price mode in which trade instructions are accepted based on the reference data; and
responsive to determining that a time at which the trading instructions are received is outside the time window, operating in an implied-price mode in which trade instructions are accepted.

6. A non-transitory computer-readable storage medium storing instructions that, when executed by one or more processors in an exchange computer system, cause the one or more processors to perform operations comprising:
transmitting, to a computer network comprising one or more user devices configured to wirelessly communicate with the exchange computer system, reference data for a financial instrument that includes a price for the financial instrument at a beginning of a time window;
providing, to at least one of the one or more user devices through the computer network, a graphical user interface configured to generate and display dynamic-interface data indicative of a moneyness index associated with the financial instrument;

receiving, through the computer network, strike calls of a first type for an index associated with the financial instrument, wherein the index is the moneyness index of a current price for the financial instrument versus reference data;

receiving, through the computer network, strike puts of a first type for the index associated with the financial instrument;

receiving, through the computer networks, trade instructions for the index, each trade instruction being based on one of a group comprising the strike calls of the first type and the strike puts of the first type;

for each received trade instruction, generating a trade record for the index and storing the trade record in a delay buffer, the trade record comprising a data field recording an identifier of the time window;

determining, after an end of the time window, an ending price for the financial instrument that represents a price of the financial instrument at the end of the time window; and for each trade record in the delay buffer, settling, after the end of the time window, each strike call of the first type for the index and each strike put of the first type for the index using the reference data and the ending price; and providing, to the at least one of the one or more user devices through the computer network, data for configuring the graphical user interface to dynamically update content in the graphical user interface including the moneyness index.

7. The non-transitory computer-readable storage medium of claim 6, wherein the operations further comprise switching to an implied-price mode when a trade request is received outside of predetermined trading hours.

8. The non-transitory computer-readable storage medium of claim 7, wherein, in the implied-price mode, the exchange computer system, utilizes an implied price determined using a weekly options price.

9. The non-transitory computer-readable storage medium of claim 7, wherein, in the implied-price mode, the exchange computer system, utilizes an implied price determined using a real-time price over a user-specified number of days of a month.

10. The non-transitory computer-readable storage medium of claim 7, wherein the operations further comprise:

responsive to determining that a time at which the trading instructions are received is within the time window, operating in an explicit-price mode in which trade instructions are accepted based on the reference data; and responsive to determining that a time at which the trading instructions are received is outside the time window, operating in an implied-price mode in which trade instructions are accepted.

11. An exchange computer system, comprising:

one or more non-transitory machine-readable storage devices configured to store instructions that are executable by one or more processing devices to cause performance of operations comprising:

transmitting, to a computer network comprising one or more user devices configured to wirelessly communicate with the exchange computer system, reference data for a financial instrument that includes a price for the financial instrument at a beginning of a time window;

providing, to at least one of the one or more user devices through the computer network, a graphical user interface configured to generate and display dynamic-interface data indicative of a moneyness index associated with the financial instrument;

receiving, through the computer network, strike calls of a first type for an index associated with the financial instrument, wherein the index is a moneyness index of a current price for the financial instrument versus reference data;

receiving, through the computer network, strike puts of a first type for the index associated with the financial instrument;

receiving, through the computer networks, trade instructions for the index, each trade instruction being based on one of a group comprising the strike calls of the first type and the strike puts of the first type;

for each received trade instruction, generating a trade record for the index and storing the trade record in a delay buffer, the trade record comprising a data field recording an identifier of the time window;

determining, after an end of the time window, an ending price for the financial instrument that represents a price of the financial instrument at the end of the time window; and for each trade record in the delay buffer, settling, after the end of the time window, each strike call of the first type for the index and each strike put of the first type for the index using the reference data and the ending price; and providing, to the at least one of the one or more user devices through the computer network, data for configuring the graphical user interface to dynamically update content in the graphical user interface including the moneyness index.

12. The exchange computer system of claim 11, wherein the one or more processing devices are configured to switch to an implied-price mode when a trade request is received outside of predetermined trading hours.

13. The exchange computer system of claim 12, wherein, in the implied-price mode, the exchange computer system, utilizes an implied price determined using a weekly options price.

14. The exchange computer system of claim 12, wherein, in the implied-price mode, the exchange computer system, utilizes an implied price determined using a real-time price over a user-specified number of days of a month.

15. The exchange computer system of claim 13, the one or more processing devices are configured to:

responsive to determining that a time at which the trading instructions are received is within the time window, operate in an explicit-price mode in which trade instructions are accepted based on the reference data; and responsive to determining that a time at which the trading instructions are received is outside the time window, operate in an implied-price mode in which trade instructions are accepted based.

* * * * *